United States Patent
Kirubakaran et al.

(10) Patent No.: US 11,422,849 B2
(45) Date of Patent: Aug. 23, 2022

(54) TECHNOLOGY FOR DYNAMICALLY GROUPING THREADS FOR ENERGY EFFICIENCY

(71) Applicant: Intel Corporation, Santa Clara, CA (US)

(72) Inventors: Deepak Samuel Kirubakaran, Hillsboro, OR (US); Vijay Dhanraj, Beaverton, OR (US); Russell Jerome Fenger, Beaverton, OR (US); Hisham Abu-Salah, Majdal Shams (IL); Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 16/547,767

(22) Filed: Aug. 22, 2019

(65) Prior Publication Data
US 2021/0055958 A1 Feb. 25, 2021

(51) Int. Cl.
*G06F 1/32* (2019.01)
*G06F 9/46* (2006.01)
(Continued)

(52) U.S. Cl.
CPC .......... *G06F 9/4831* (2013.01); *G06F 1/3296* (2013.01); *G06F 1/3203* (2013.01);
(Continued)

(58) Field of Classification Search
CPC .... G06F 9/4831; G06F 9/3851; G06F 9/3857; G06F 9/5027; G06F 9/52; G06F 9/484;
(Continued)

(56) References Cited

U.S. PATENT DOCUMENTS 7,707,578 B1 * 4/2010 Zedlewski ............ G06F 9/5027
718/102
2002/0184290 A1 12/2002 Olszewski et al.
(Continued)

OTHER PUBLICATIONS

Bret Olszewski et al.,Performance Workloads in a Hardware Multi Threaded Environment, 2002 [Retrieved on Dec. 13, 2021], Retrieved from the internet: <URL: https://citeseerx.ist.psu.edu/viewdoc/download?doi=10.1.1.13.4876&rep=rep1&type=pdf> 12 Pages (1-12) (Year: 2002).*

(Continued)

*Primary Examiner* — Anibal Rivera
(74) *Attorney, Agent, or Firm* — Trop, Pruner & Hu, P.C.

(57) ABSTRACT

A data processing system with technology for dynamically grouping threads includes a machine-readable medium and first and second cores, each with multiple logical processors (LPs). The system also comprises an operating system which, when executed, enables the system to select an LP to receive a new low-priority thread and to assign the new low-priority thread to the selected LP. The operation of selecting an LP to receive the new low-priority thread comprises, when the first core has multiple idle LPs, automatically determining whether the second core has an idle LP and a busy LP that is executing a current low-priority thread. In response to determining that the second core has an idle LP and a busy LP that is executing a current low-priority thread, the system automatically selects the idle LP in the second core to receive the new low-priority thread. Other embodiments are described and claimed.

22 Claims, 13 Drawing Sheets

(51) Int. Cl.
*G06F 9/455* (2018.01)
*G06F 9/48* (2006.01)
*G06F 1/3296* (2019.01)
*G06F 9/50* (2006.01)
*G06F 1/3234* (2019.01)
*G06F 9/38* (2018.01)
*G06F 1/3203* (2019.01)
*G06F 1/3287* (2019.01)
*G06F 1/329* (2019.01)
*G06F 11/34* (2006.01)

(52) U.S. Cl.
CPC ............ *G06F 1/329* (2013.01); *G06F 1/3243* (2013.01); *G06F 1/3287* (2013.01); *G06F 9/3851* (2013.01); *G06F 9/3857* (2013.01); *G06F 9/5027* (2013.01); *G06F 9/5077* (2013.01); *G06F 11/3423* (2013.01); *G06F 2209/5018* (2013.01); *G06F 2209/5022* (2013.01)

(58) Field of Classification Search
CPC .... G06F 1/3296; G06F 1/3203; G06F 9/5077; G06F 9/3009; G06F 1/3287; G06F 1/3243; G06F 2209/5018; G06F 2209/5022; G06F 2209/507; G06F 11/3423
See application file for complete search history.

(56) References Cited

U.S. PATENT DOCUMENTS

| | | | | |
|---|---|---|---|---|
| 2008/0271043 | A1* | 10/2008 | Kim .................... | G06F 11/3423 718/108 |
| 2009/0007120 | A1 | 1/2009 | Fenger et al. | |
| 2009/0235270 | A1 | 9/2009 | Anand et al. | |
| 2010/0229172 | A1* | 9/2010 | Burns .................... | G06F 9/3851 718/100 |
| 2014/0181555 | A1* | 6/2014 | Bodas .................... | G06F 1/324 713/323 |
| 2015/0135189 | A1 | 5/2015 | Song | |
| 2015/0355705 | A1* | 12/2015 | Weissmann ............. | G06F 1/324 713/320 |
| 2019/0102229 | A1 | 4/2019 | Gupta et al. | |

OTHER PUBLICATIONS

Shameem Akhter et al., Multi-Core Programming, Apr. 2006, [Retrieved on Mar. 30, 2022], Retrieved from the internet: <URL: https://www.es.ele.tue.nl/~heco/courses/ACA/Multi-CoreProgramming-Ch1_Akhter_Roberts.pdf> 22 Pages (1-19) (Year: 2006).*

Sergey Zhuravlev et al., Survey of Scheduling Techniques for Addressing Shared Resources in Multicore Procesors, Nov. 2012, [Retrieved on Mar. 30, 2022], Retrieved from the internet: <URL: https://dl.acm.org/doi/pdf/10.1145/2379776.2379780> 28 Pages (1-28) (Year: 2012).*

International Searching Authority, "Notification of Transmittal of the International Search Report and the Written Opinion of the International Searching Authority," dated Oct. 27, 2020, in International application No. PCT/US2020/042900.

"Intel® 64 and IA-32 Architectures, Software Developer's Manual, vol. 3B: System Programming Guide, Part 2", Sep. 2016, 582 pages, Intel Corporation.

"PerfEnergyPreference", Microsoft, Oct. 4, 2017, 2 pages.

"Dell XPS Speed Shift", NotebookReview, downloaded Jun. 27, 2019, 17 pages.

* cited by examiner

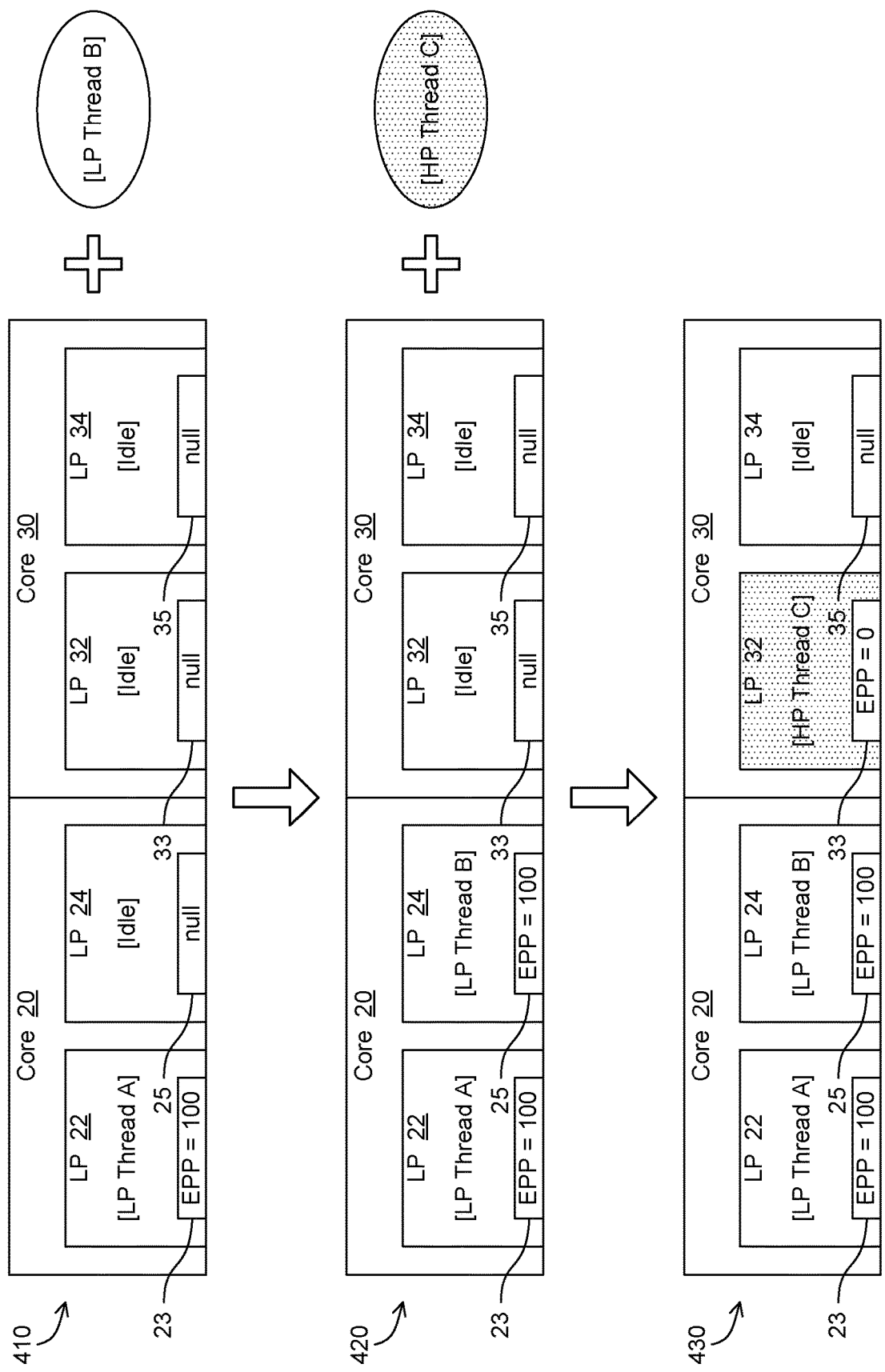

TECHNOLOGY FOR DYNAMICALLY GROUPING THREADS FOR ENERGY EFFICIENCY

TECHNICAL FIELD

The present disclosure pertains in general to data processing systems and in particular to technology to enable processors to operate efficiently.

BACKGROUND

A data processing system may include a central processing unit (CPU) with multiple cores, and each core may include multiple logical processors (LPs) to provide for simultaneous multithreading (SMT). The data processing system may execute software as threads on the CPU, and each LP may execute a thread concurrently with other threads running on other LPs. In particular, an operating system (OS) may assign each thread to a particular LP. Also, the group of LPs which share a core may be referred to as siblings.

The CPU may also be capable of executing at different frequencies at different times, with more power being needed as the frequency increases. In particular, each acceptable frequency may be paired with a corresponding voltage requirement. Each different voltage-frequency pairing that a CPU supports may be referred to as a "performance state" or "P-state." However, a conventional CPU may be designed to utilize a monolithic P-state model. Under the monolithic P-state model, the CPU always uses the same P-state for all of the cores. In other words, the current P-state sets the speed and voltage for all of the cores in the CPU. Thus, for such a CPU, the P-state is per CPU. By contrast, some current development efforts are directed towards a type of CPU that allows different cores in the CPU to use different P-states at the same. For instance, a power management unit in the CPU may be capable of setting each core to a different P-state. Thus, this type of CPU supports per-core P-state (PCPS).

Some conventional CPUs include additional technologies to enhance efficiency, such as those technologies provided by Intel Corporation under names or trademarks such as "Hardware-Controlled Performance States" (HWP), "Hardware Duty Cycling" (HDC), etc. Also, the CPU may allow the OS to specify a performance/efficiency preference for each thread. In other words, the CPU may support software-specified per-thread efficiency/performance preferences.

Nevertheless, at least in some circumstances, it may be desirable to achieve levels of performance and efficiency that exceed those provided by conventional data processing system. For instance, it may be desirable to increase the number of hours of battery life that can be provided by battery-powered data processing systems.

As described in greater detail below, the present disclosure introduces technology to enable a CPU to achieve desirable levels of both performance and efficiency.

BRIEF DESCRIPTION OF THE DRAWINGS

Features and advantages of the present invention will become apparent from the appended claims, the following detailed description of one or more example embodiments, and the corresponding figures, in which:

FIG. 4 is a block diagram depicting three different stages of a process for assigning threads to LPs when more than one core has an idle LP.

DETAILED DESCRIPTION

When the OS in a data processing system specifies a high-performance hint for one LP in a core and a high-efficiency hint for anther LP in that core, the CPU may give preference to the high-performance hint and, in effect, disregard the high-efficiency hint, by setting the core to a relatively high P-state, in response to the high-performance hint. In other words, a high-performance software request/hint on an LP overrides a high-efficiency request/hint on its SMT sibling. Consequently, the data processing system may lose the opportunity to run background work efficiently, which may significantly impact battery life. Thus, a CPU may be unable to achieve optimum efficiency when software specifies different efficiency/performance preferences for different LPs on the same core.

As indicated above, the present disclosure introduces technology to enable a CPU to achieve desirable levels of both performance and efficiency. In particular, the present disclosure introduces technology for dynamically grouping threads for energy efficiency. For instance, as described in greater detail below, an OS in a data processing system may assign threads to LPs in a way that reduces or eliminates the likelihood that a core will have a high-performance thread on one LP and a high-efficiency thread on another LP. Consequently, the data processing system may operate with more energy efficiency than a conventional data processing system. For purposes of this disclosure, to "assigning" a thread to an LP means to start the thread running on that LP. Typically, threads are assigned to LPs by a scheduler in the OS. Accordingly, "assigning" a thread to an LP may also be referred to as "scheduling" a thread on an LP or "dispatching" a thread to an LP.

As described in greater detail below, the present disclosure describes technology for grouping threads in ways that improve the energy efficiency and/or the performance of a data processing system, relative to conventional data processing systems.

Figure 1:
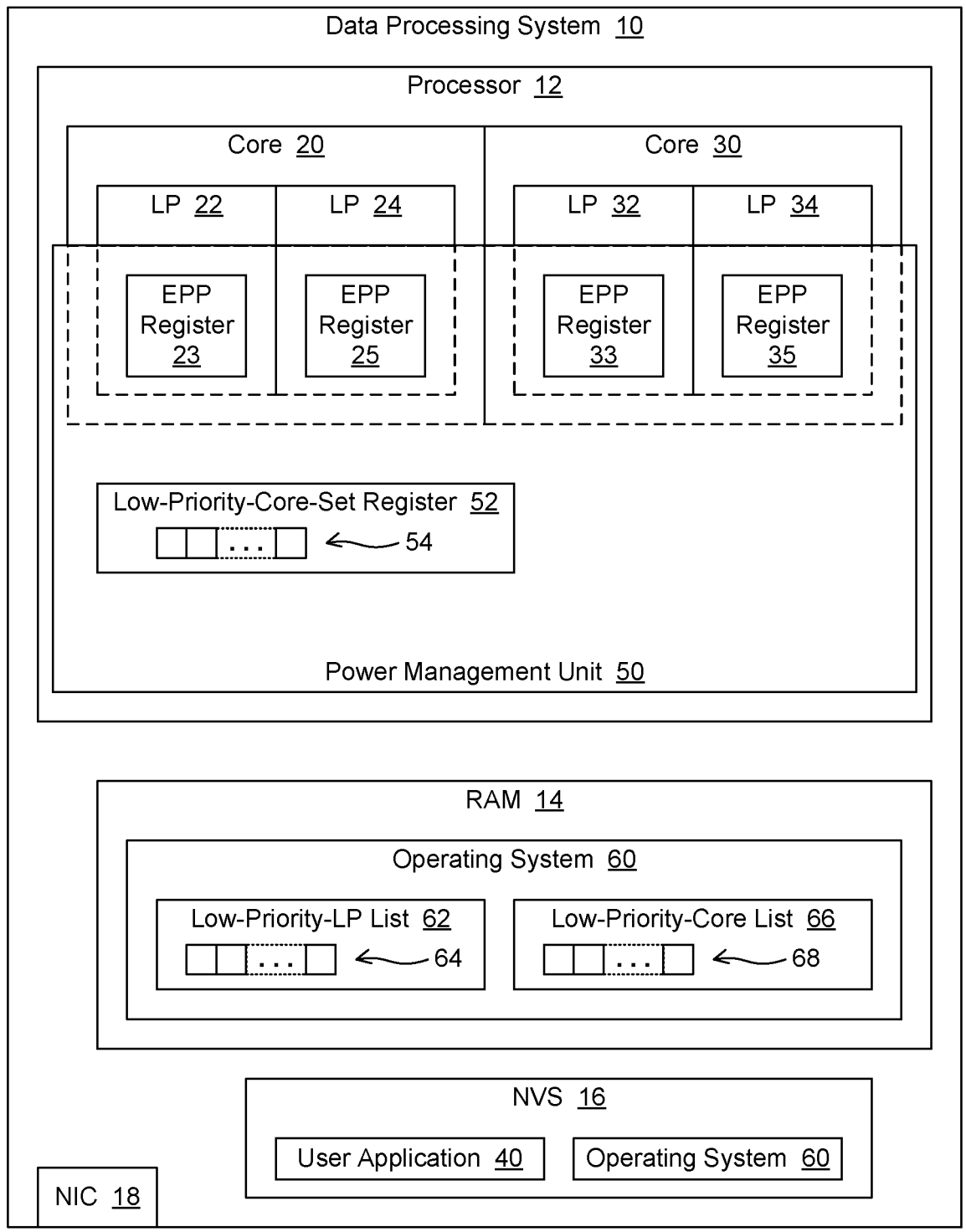
FIG. 1 is a block diagram depicting an example embodiment of a data processing system with technology for dynamically grouping threads for energy efficiency.

FIG. 1 is a block diagram depicting an example embodiment of a data processing system 10 with technology for dynamically grouping threads for energy efficiency. Data processing system 10 is a hypothetical system, with various hypothetical components and features to illustrate the technology introduced herein.

In the embodiment of FIG. 1, data processing system 10 includes a CPU or processor 12, along with other components such as random access memory (RAM) 14, non-volatile storage (NVS) 16, a network interface controller (NIC) 18, etc. A processor may be implemented as an integrated circuit or "chip" that is mounted to a substrate to form a package. Alternatively, a processor may be implemented as a package that contains more than one chip.

In the embodiment of FIG. 1, processor 12 includes two cores 20 and 30, as well as other modules, such as a power management unit (PMU) 50. PMU 50 may also be referred to as a power control unit. In addition, each core provides for two logical processors (LPs). Specifically, core 20 includes LP 22 and LP 24, and core 30 includes LP 32 and LP 34. However, in other embodiments, a processor may include fewer cores or more cores, and fewer LPs or more LPs per core. For instance, a processor may include tens or hundreds of cores, and each of those cores may include one or more LPs. Accordingly, even though each core in FIG. 1 includes only two LPs, the present teachings apply as well to cores with three or more LPs. Consequently, instead of referring to "both" of the LPs in a core, this disclosure may refer more generally to "all" of the LPs in a core, or vice versa. Also, as indicated above, when a core includes multiple LPs, those LPs may be referred to as siblings.

NVS 16 includes software such as an OS 60, one or more user applications 40, etc. Data processing system 10 may copy the software into RAM 14 for execution on one or more of the LPs. In particular, data processing system 10 may execute the software as threads on processor 12, and each LP may execute a thread concurrently with other threads running on other LPs.

In processor 12, PMU 50 is capable of setting each core to a different P-state. In other words, processor 12 supports per-core P-state.

As described in greater detail below, in the embodiment of FIG. 1, PMU 50 includes various data storage structures to contain power management settings pertaining to the various cores, LPs, and such within processor 12. For purposes of this disclosure, such data storage structures may be referred to as registers. In one embodiment, such registers are implemented as "special-purpose registers" (SPRs). An SPR may also be referred to as a "model-specific register" (MSR).

As described in greater detail below, one type of power management setting may be referred to as an "efficiency/performance preference (EPP) setting." In the embodiment of FIG. 1, PMU 50 provide one EPP register for each LP. OS 60 may use EPP registers 23, 25, 33, and 35 to provide a different EPP setting for each different thread being executed. In particular, OS 60 may use the EPP setting for an LP to provide an indication to the processor as to whether the thread for that LP should be executed in a manner to prefer energy efficiency or in a manner to prefer performance. For instance, OS 60 may provide an EPP setting to indicate a workload category (e.g., real time, foreground, high priority, high performance, background, low priority, high efficiency, etc.).

In one embodiment, such EPP settings may follow the guidelines set forth for "energy/performance preference control" in documents such as the "Intel® 64 and IA-32 Architectures, Software Developer's Manual, Volume 3B: System Programming Guide, Part 2" from September of 2016 (the "SDM"). For instance, as indicated on pages 14-8 and 14-9 of the SDM, an OS may write an EPP setting or value to bites 31:24 of an SPR referred to as the "IA32 HWP REQUEST Register," with the value 0 indicating that maximum performance is preferred, and 0FFFxH indicating that maximum energy efficiency is preferred. However, for purposes of illustration, the present disclosure describes a hypothetical scenario in which processor 12 supports EPP settings of 0-100, with 0 indicating that maximum performance is preferred, and 100 indicating that maximum energy efficiency is preferred. EPP settings may also be referred to as "software hints." PMU 50 may automatically select the P-state for the cores based at least in part on those hints. For instance, for each core, PMU 50 may select the P-state based on the EPP settings and the current workload for that core, and then PMU control flows will apply that P-state to the core.

Also, for purposes of this disclosure, the term "high priority" may be used in general to refer to an EPP setting that is on the high-performance half of the spectrum (0-50), and the term "low priority" may be used in general to refer to an EPP setting that is on the high-efficiency half of the spectrum (51-100). Similarly, the term "high power state" may be used to refer to a P-state that is on the high-performance half of the spectrum or supported P-states, and the term "low power state" may be used to refer to a P-state that is on the low-performance (or high-efficiency) half of the spectrum or supported P-states.

FIG. 1 uses dashed lines to indicate which power management settings pertain to which components. For instance, the dashed lines surrounding EPP register 23 indicate that the EPP setting in that register pertains to LP 22.

In addition, PMU 50 includes a low-priority-core-set (LPCS) register 52 for power management settings which pertain to multiple cores. LPCS register 52 may also be referred to as a "hardware efficiency coreset MSR." In the embodiment of FIG. 1, LPCS register 52 includes an entry 54 for each core in processor 12, to indicate which cores are not running any high-priority threads. How data processing system 12 uses LPCS register 52 is described in greater detail below.

Thus, EPP registers 23, 25, 33, and 35 contain per-LP power management settings, and LPCS register 52 contains globally-applicable power management settings. However, in other embodiments, a processor may use any suitable number of registers to store power management settings (e.g., all settings may be stored in a single register). Accordingly, for purposes of this disclosure, the term "register" may be used to refer to a portion of a register, related portions of multiple registers, etc. Also, in other embodiments, a data processing system may include multiple sockets to accommodate multiple processors. Each of those processors may include features like those described above with regard to processor 12.

Since processor 12 supports per-core P-state, PMU 50 may be able to save power (relative to a processor that must use the same P-state for all cores) by running one or more cores at a relatively low P-state, while running one or more other cores at a relatively high P-state. In addition, it may be possible to increase the frequency of a subset of the cores by using the power headroom saved on another subset of the cores.

As indicated above, the present disclosure describes technology for grouping threads in ways that improve energy efficiency by reducing or eliminating the likelihood that a core will have a high-priority thread on one LP and a low-priority thread on another LP. For instance, OS 60 may maintain lists which indicate which LPs and which cores are not running high-priority threads, and OS 60 may consult those lists before assigning a new thread to an LP. In particular, if an LP is idle or if it is running a low-priority thread, that LP may be referred to as a "low-priority LP" or a "background LP." Similarly, if all of the LPs in a core are either idle or running low-priority threads, that core may be referred to as a "low-priority core" or a "background core."

OS 60 includes a low-priority-LP list 62 to identify the low-priority LPs, and a low-priority-core list 66 to identify the low-priority cores. The list of low-priority LPs may also be referred to as the "low-priority LP set," the "background LP set," or the "Low-Priority-LP-List." Similarly, the list of low-priority cores may also be referred to as the "low-priority core set," the "background core set," or the "Low-Priority-Core-List." In the embodiment of FIG. 1, low-priority-LP list 62 includes an LP entry 64 for each LP in processor 12, and OS 60 sets or clears each of those entries to indicate whether or not the corresponding LP is a low-priority LP. Similarly, low-priority-core list 66 includes a core entry 68 for each core in processor 12, and OS 60 sets or clears each of those entries to indicate whether or not the corresponding core is a low-priority core.

Moreover, as described in greater detail below, OS 60 may use those lists to assign threads to LPs in ways that enable processor 12 to operate efficiently. For instance, OS 60 may use those lists to determine which threads and LPs are low priority and which are high priority, as well as which cores are low priority and which are high priority.

Figure 2:
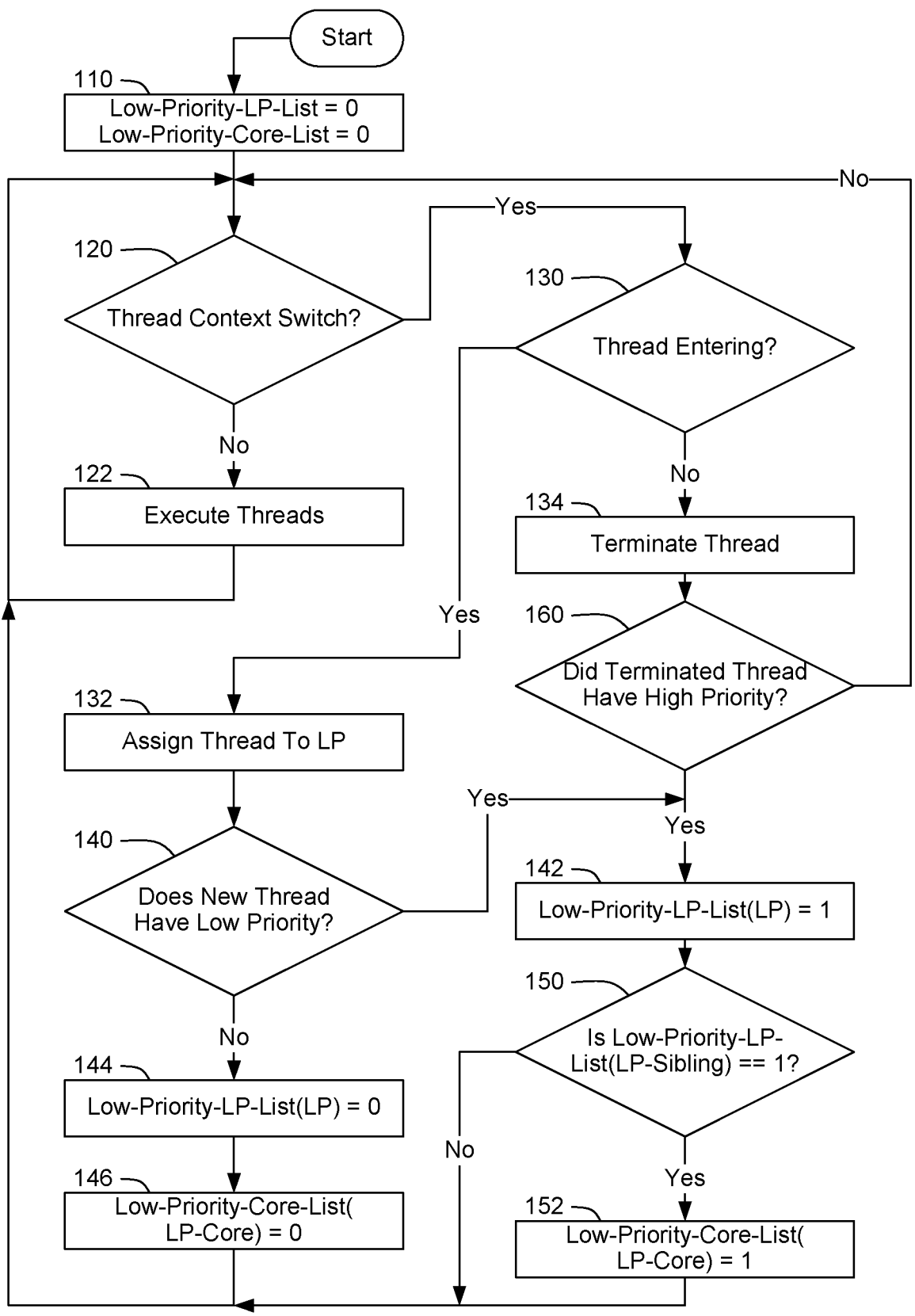
FIG. 2 presents a flowchart of an example embodiment of a process for managing energy efficiency settings for cores and LPs.

FIG. 2 presents a flowchart of an example embodiment of a process for managing energy efficiency settings for cores and LPs. The process of FIG. 2 may start with data processing system 10 booting to OS 60. Upon boot up, OS 60 may clear all entries 64 and 68 in low-priority-LP list 62 and low-priority-core list 66, respectively, as shown at block 110. OS 60 may then start assigning threads to LPs for execution and removing threads from LPs when those threads are idle, preempting threads, etc. For purposes of this disclosure, actions such as assigning a thread to an LP for execution and removing a thread from an LP when the thread is idle or finished may be referred to as "context switches."

In particular, as shown at block 120, OS 60 may determine whether a context switch should be performed. If that determination is negative, processor 12 may simply continue to execute any active threads, as shown at block 122. However, if that determination is positive, OS 60 may also determine whether the context switch is for a new thread entering execution, as shown at block 130. If the context switch is for a new thread entering execution, OS 60 may assign that thread to an LP, as shown at block 132. The LP selected to receive the new thread may be referred to as the "target LP." Also, the core that contains the target LP may be referred to as the "target core." Furthermore, some of the control logic for determining which target LP is to receive that thread is described in greater detail below with regard to FIGS. 3A-3B.

Also, OS 60 may determine whether the new thread is to run with low-priority, as shown at block 140. For instance, if OS 60 is scheduling a thread to perform background processing, OS 60 may determine that the new thread should run with low-priority, and accordingly, OS 60 may set the EPP register for the target LP with a low-priority setting. In response to a determination that the new thread is to run with low-priority, OS 60 may set the entry for the target LP in low-priority-LP list 62, as shown at block 142 with the expression "Low-Priority-LP-List(LP)=1".

Also, as shown at block 150, OS 60 may determine whether all of the sibling LPs in the target core are also low-priority LPs. If the sibling LPs are also low-priority LPs, OS 60 may also set the entry in low-priority-core list 66 for the target core, as shown at block 152 with the expression "Low-Priority-Core-List(LP-Core)=1".

However, referring again to block 140, if the new thread does not have low priority (i.e., if the thread has high priority), OS 60 may clear the entry for the target LP in low-priority-LP list 62, as shown at block 144. OS 60 may also clear the entry for the target core in low-priority-core list 66, as shown at block 146. The process may then return to block 120, with processor 12 continuing to run the current threads until the next context switch.

Also, referring again to block 130, if a new thread is not entering, the context switch is for an old thread that is exiting. Accordingly, as shown at block 134, OS 60 may terminate that old thread, thereby making the LP for that thread idle. For purposes of this disclosure, the LP for a thread that is being terminated may be referred to as the "target LP," and the core that contains the target LP may be referred to as the "target core."

Also, as shown at block 160, OS 60 may determine whether the terminated thread had high priority. And if it did, OS 60 may set the entry for that LP in low-priority-LP list 62, as shown at block 142. Accordingly, an entry that is set in low-priority-LP list 62 indicates that the corresponding LP is a low-priority LP.

Also, as shown at block 150, OS 60 may determine whether the sibling LPs are also low-priority LPs. If they are, OS 60 may set the entry for the target core in low-priority-core list 66, as shown at block 152. Thus, whenever the last high-priority thread on a core terminates, OS 60 marks that core as a low-priority core. The process may then return to block 120, with processor 12 continuing to run the current threads until the next context switch. Thus, OS 60 keeps track of which LPs and which cores are low-priority.

Figure 3A:
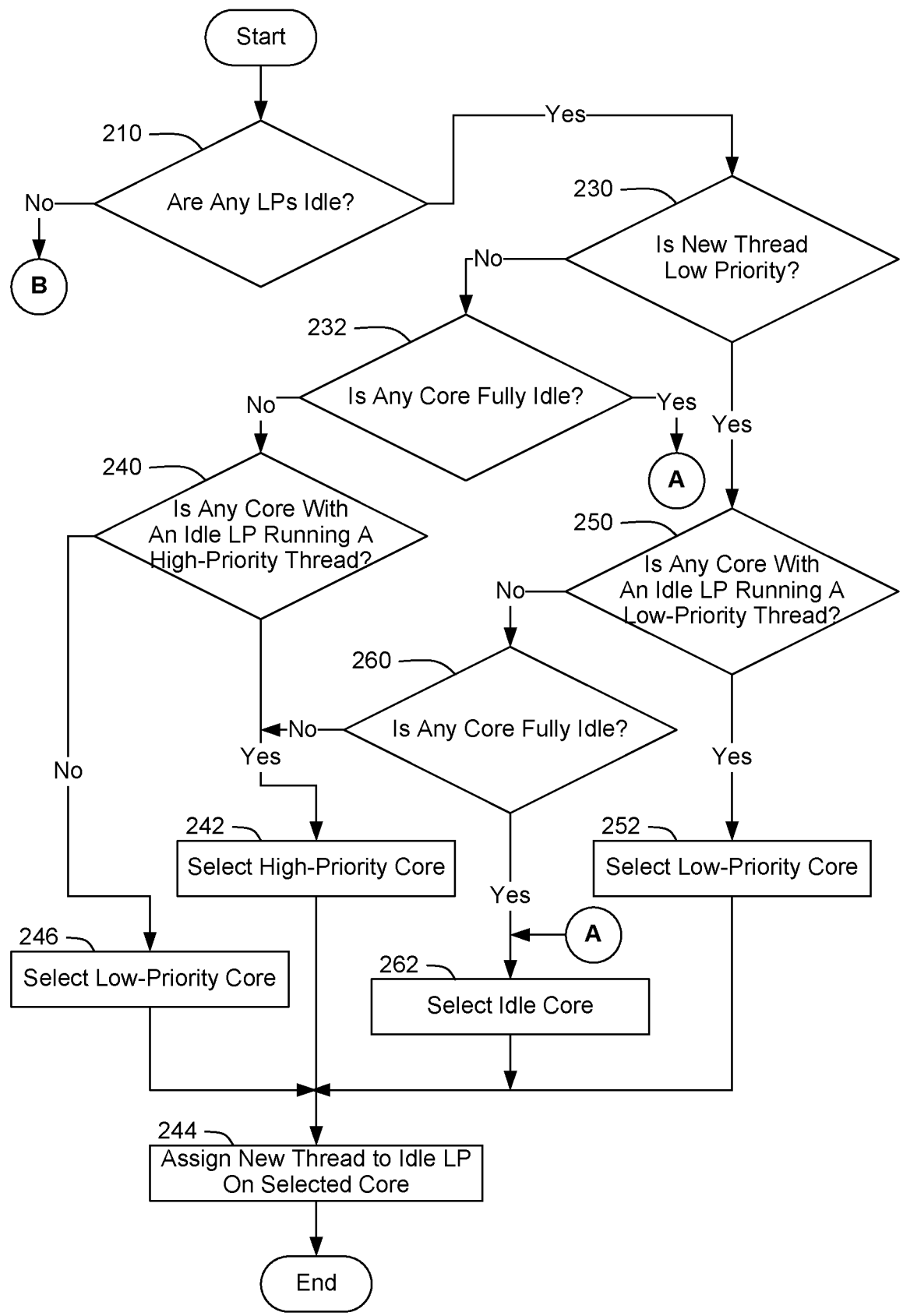
FIGS. 3A-3B present a flowchart of an example embodiment of a process for dynamically grouping threads for energy efficiency.
Figure 3B:
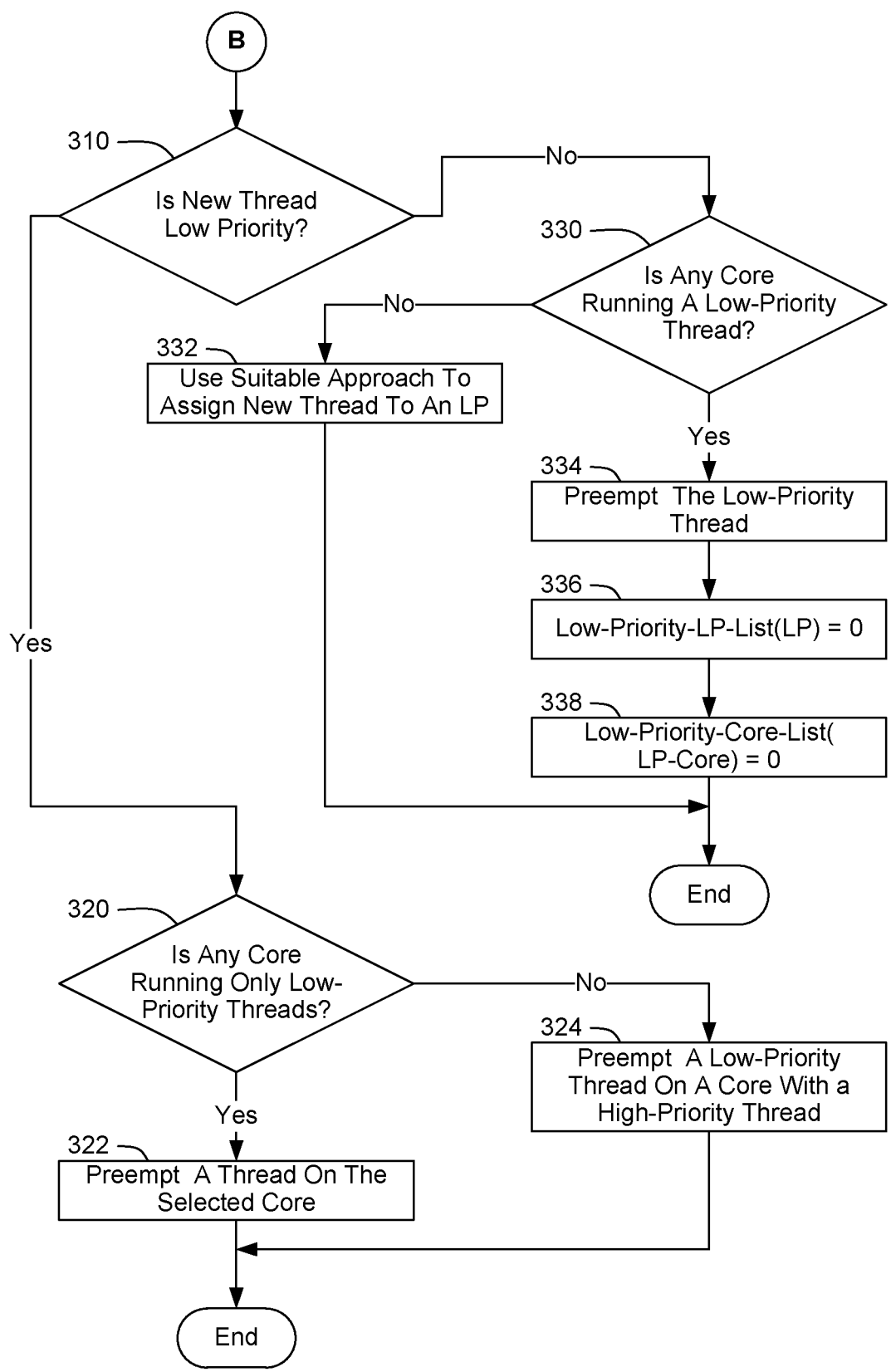

FIGS. 3A-3B present a flowchart of an example embodiment of a process for dynamically grouping threads for energy efficiency. In particular, FIGS. 3A-3B provide more details for the operation at block 132 of FIG. 2 for selecting a target LP to receive a new thread. As shown at block 210, the process of FIG. 3A may start with OS 60 determining whether any of the LPs in processor 12 are idle. If no LPs are idle, the process may pass through page connector B to FIG. 3B.

If an LP is idle, OS 60 may take different branches depending on whether the new thread is a low-priority thread or a high-priority thread, as shown at block 230. If the new thread is a high-priority thread, OS 60 may determine whether any core has all of its LPs idle, as shown at block 232. If any core is fully idle, the process may pass through connector A, and OS 60 60 may select an idle LP on a fully idle core, as shown at block 262. If no idle core is available, OS 60 may determine whether any of the cores with an idle LP is also running a high-priority thread on another LP, as shown at block 240. If any core has an idle LP and a high-priority LP, OS 60 may select that core (which may be referred to as a "high-priority core"), as shown at block 242. Also, OS 60 may assign the new thread to the idle LP on that selected core, as shown at block 244. Thus, OS 60 may group high-priority threads together on a core, thereby enable processor 12 to manage efficiency and performance more effectively than if the core were to include mixed LPs (i.e., one or more high-priority LPs along with one or more low-priority LPs). The process may then end.

However, referring again to block 240, if all of the cores with idle LPs have only low-priority LPs, OS 60 may select one of those cores (which may be referred to as a "low-priority core"), as shown at block 246. Also, OS 60 may assign the new thread to the idle LP on that selected core, as shown at block 244, and the process may then end. Also, as indicated above with regard to blocks 144 and 146 of FIG. 2, OS 60 may clear the entries for the target LP and the target core in low-priority-LP list 62 and low-priority-core list 66.

However, referring again to block 230 if FIG. 3A, if the new thread is a low-priority thread, OS 60 may determine whether any of the low-priority cores with an idle LP is running a low-priority thread, as shown at block 150. If there is a low-priority core with an idle LP and another LP running a low-priority thread, OS 60 may select that core, as shown at block 252.

If there is no low-priority core with (a) an idle LP and (b) another LP running a low-priority thread, OS 60 may determine whether any core has all of its LPs idle, as shown at block 260. If any core has all of its LPs idle, OS 60 may select the fully idle core, as shown at block 262. However, if no core is fully idle, OS 60 may select a high-priority core, as shown at block 242. As shown at block 244, OS 60 may assign the new thread to the idle LP on the selected core.

Alternatively, if (a) there is no low-priority core with (i) an idle LP and (ii) another LP running a low-priority thread, and (b) there is no fully idle core, then OS 60 may (a) look for a low-priority LP on a low-priority core to preempt, in case the new low-priority thread has higher priority than the existing low-priority thread, or (b) wait until a low-priority LP becomes available to schedule the new low-priority thread.

The process of FIG. 3A may then end.

FIG. 4 is a block diagram depicting three different stages of a process for assigning threads to LPs when more than one core has an idle LP. Those stages correspond to parts of the process depicted in FIG. 3A. In particular, as shown in FIG. 4 at a first stage 410, core 20 is running a low-priority thread A on LP 22, while LPs 24, 32, and 34 are idle. Also, at stage 410, OS 60 has a new low-priority thread B to assign to an LP, with the new thread depicted as an oval.

Using the process of FIG. 3A, at blocks 252 and 244, OS 60 selects LP 24 as the target LP, since core 20 has an idle LP and its sibling LP is a running a low-priority thread. The low priority of LP 22 is reflected in the EPP setting of 100 in EPP register 23. It will also be reflected in the corresponding entry in low-priority-LP list 62.

Consequently, as shown at stage 420, OS 60 has assigned low-priority thread B to LP 24. Also, OS 60 is preparing to assign new high-priority thread C to an LP. For purposes of this disclosure, dotted fill may be used to denote high priority. If processor 12 would have a core with an idle LP and a high-priority LP, OS 60 would assign high-priority thread C to that idle LP, as per block 242 of FIG. 3A. However, in the scenario of FIG. 4, at stage 420, processor 12 has no such core. Consequently, at blocks 246 and 244 of FIG. 3A, OS 60 selects low-priority core 30 as the target core, and OS 60 assigns high-priority thread C to LP 32 in core 30, as shown at stage 430 of FIG. 4. The high priority of LP 32 is reflected in the EPP setting of 0 in EPP register 33 (and the dotted fill for LP 32 in stage 430). Consequently, processor 12 may now optimize efficiency for core 20, while optimizing performance for core 30.

By contrast, in a conventional data processing system, when assigning a thread like low-priority thread B, the OS would select an LP on a fully idle core, rather than selecting an LP on a core that is not fully idle. Consequently, when subsequently assigning a high-priority thread in a scenario like that of FIG. 4, the only available idle threads would be on cores that are already running low-priority threads. And once the OS assigns the high-priority thread to one of those LPs, it would be difficult, impossible, or counterproductive for the processor to optimize one core for efficiency and the other for performance. For instance, if a core has one low-priority LP and one high-priority LP, the effectiveness of the EPP request for low-priority thread will likely be reduced (due to the processor giving preference to the numerically lower of the two sibling EPP settings). Furthermore, the foreground thread performance of the high-priority LP may be reduced, due to a reduced energy budget (relative to the energy budget in a scenario like stage 430 of FIG. 4).

Figure 5:
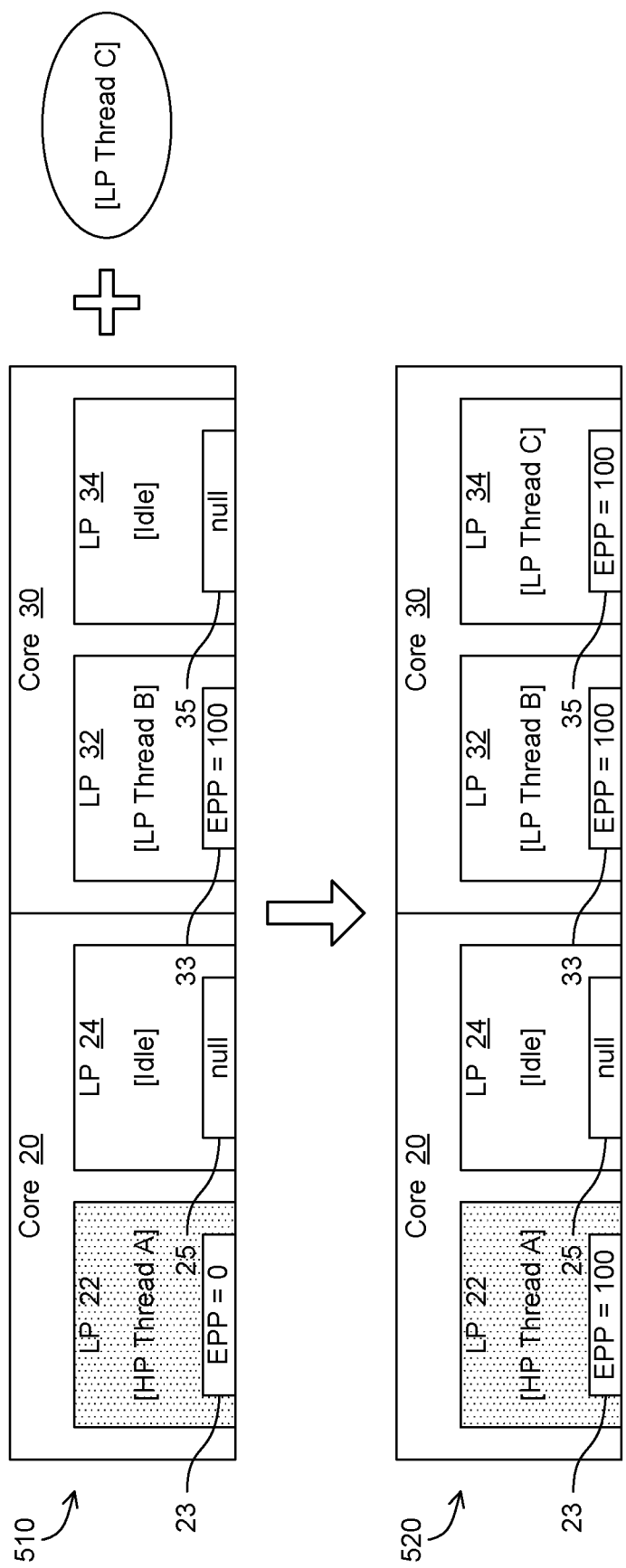
FIG. 5 is a block diagram depicting two different stages of a process for assigning threads to LPs when different cores with idle LPs also have threads with different efficiency/performance preferences.

FIG. 5 is a block diagram depicting two different stages of a process for assigning threads to LPs when different cores with idle LPs also have threads with different EPP settings. Those stages also correspond to parts of the process depicted in FIG. 3A. In particular, as shown in FIG. 5 at a first stage 510, core 20 is running a high-priority thread A on LP 22, and core 30 is running a low-priority thread B on LP 32, while LPs 24 and 34 are idle. Also, at stage 510, OS 60 has a new low-priority thread C to assign to an LP.

Using the process of FIG. 3A, at blocks 252 and 244, OS 60 selects LP 34 as the target LP, since core 30 has an idle LP and its sibling LP is a running a low-priority thread. Accordingly, as show at stage 520 of FIG. 5, core 30 has only low-priority LPs, and core 20 has a high-priority LP and an idle LP. Consequently, processor 12 may configure core 20 with settings (e.g., P-state) suitable for high performance, and processor 12 may configure core 30 with settings suitable for high efficiency.

By contrast, in a conventional data processing system, the OS might assign the new low-priority thread to a core that is also running a high-priority thread. As indicated above, that arrangement may make it difficult or impossible for the processor to provide each thread with a desirable level of performance and efficiency.

Referring again to block 210 of FIG. 3A, as indicated above, when OS 60 is selecting a target LP to receive a new thread, if no LPs are currently idle, the process may pass through page connector B to FIG. 3B. Then, as shown at block 310, OS 60 may determine whether the new thread is a low-priority thread or a high-priority thread. If it is a low-priority thread, OS 60 may assign it to a core with another low-priority thread, if possible. In particular, OS 60 may determine if any core is running only low-priority threads, as shown at block 320. And in response to a positive determination, OS 60 may preempt a low-priority thread on such a core with the new thread, as shown at block 322. Such a scenario is depicted in FIG. 6.

Figure 6:
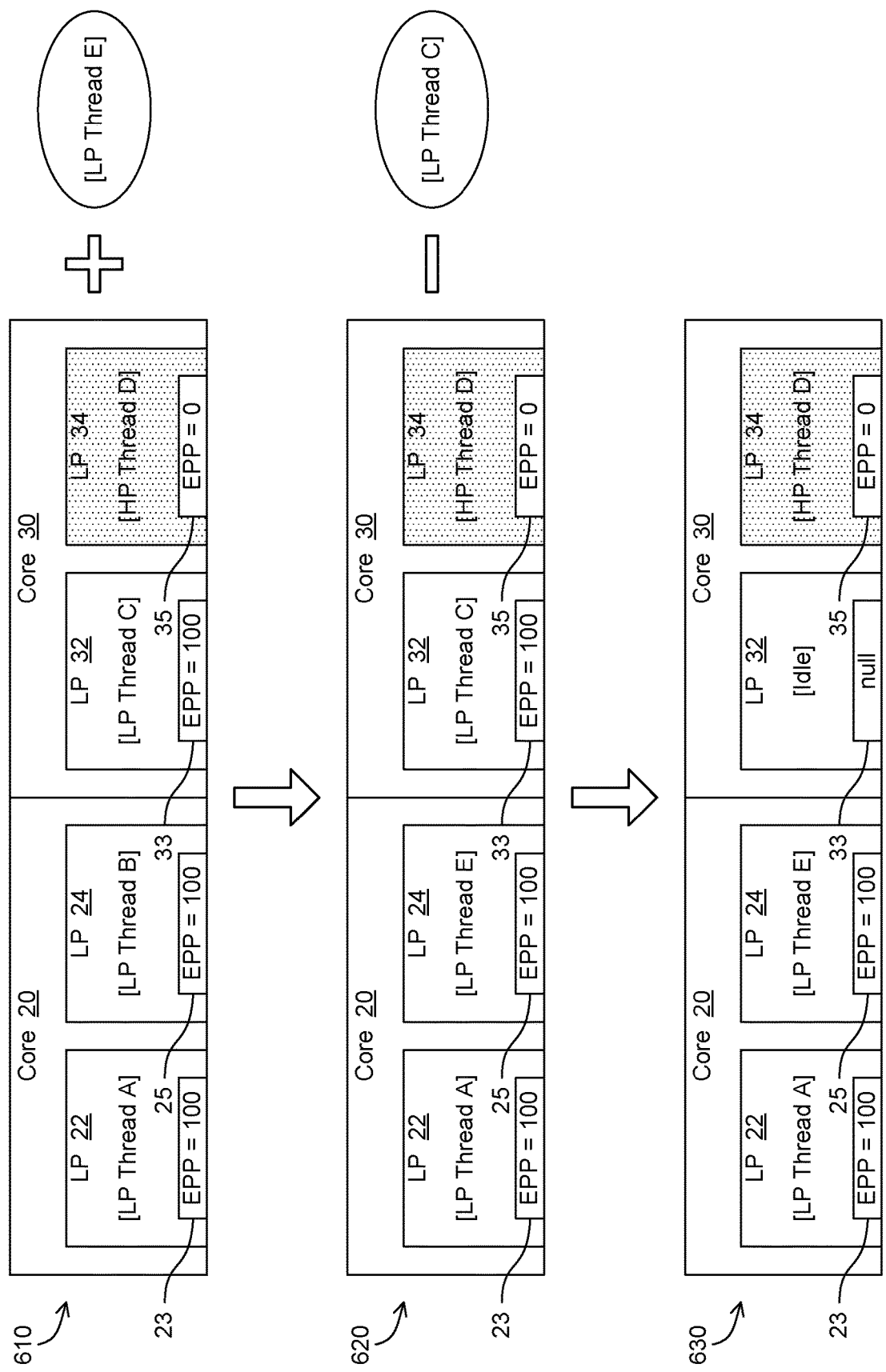
FIG. 6 is a block diagram depicting three different stages of a process for assigning threads to LPs when no core has an idle LP.

FIG. 6 is a block diagram depicting three different stages of a process for assigning threads to LPs when no core has an idle LP. In the first stage 610 of FIG. 6, LPs 22, 24, and 32 are running low-priority threads A, B, and C, respectively, while LP 34 is running high-priority thread D. Also, low-priority thread E is the new thread to be assigned to an LP by OS 60 (as indicated by the plus sign before "[LP Thread E]" at stage 610). Consequently, at blocks 320 and 322 of FIG. 3B, OS 60 will preempt one of the threads on core 20 (e.g., low-priority thread B) with low-priority thread E, as shown at stage 620 of FIG. 6.

Also, in the scenario of FIG. 6, after stage 620, one of the older LP threads terminates. Specifically, low-priority thread C on LP 32 terminates (as indicated by the minus sign before "[LP Thread C]" at stage 620). Consequently, at stage 630, LP 32 is idle. Consequently, processor 12 may then configure core 30 for high performance, while configuring core 20 for high efficiency.

By contrast, in a conventional data processing system, the OS might preempt an old low-priority thread on a core that is also running a high-priority thread. And a new low-priority thread may be unlikely to terminate before any of the older threads. Consequently, when the next LP becomes idle, that LP is more likely to be one of the LPs on the core with only low-priority threads.

By contrast, in the scenario of FIG. 6, the core with mixed LPs (i.e., the core with one low-priority LP and one high-priority LP) is likely to become uniform sooner because the new thread does not get assigned to that core.

Referring again to FIG. 3B, block 310 of FIG. 3B, if the new thread is not a low-priority thread, it is a high-priority thread to be assigned to an LP, when no LPs are idle. In such a case, the process passes to block 330, with OS 60 determining whether any core is running a low-priority thread. If any core has a low-priority LP, OS 60 selects such as an LP for the new high-priority thread and preempts the low-priority thread on that LP with the new high-priority thread, as shown at block 334. Also, as shown at blocks 336 and 338, OS 60 clears the entries for that LP and that core in low-priority-LP list 62 and low-priority-core list 66, since that LP is no longer a low-priority LP, and that core is not a low-priority core (because that core now has at least one high-priority LP). Alternatively, the operations for clearing the entries for the selected LP and the selected core could be depicted as part of FIG. 2, on the "No" branch of block 160.

However, referring again to block 330 of FIG. 3B, if OS 60 has a new high-priority thread to assign to an LP, but (a) no LPS are currently idle, and (b) no LPs are currently running low-priority thread, OS 60 may use any suitable approach for determine how to assign that new thread, as shown at block 332. For instance, OS 60 may determine whether the new thread is more important or has higher priority than any of the active high-priority threads, OS 60 may wait for an LP to become idle, etc. The process of FIG. 3B may then end.

Figure 7:
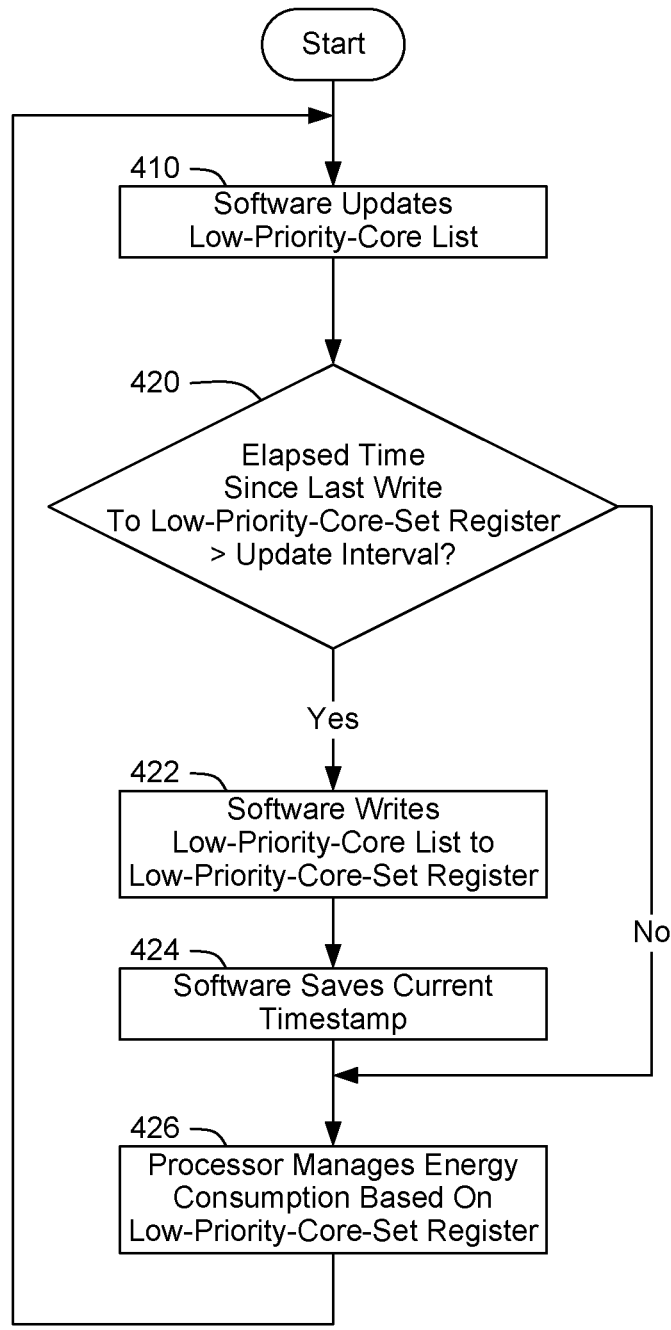
FIG. 7 presents a flowchart of an example embodiment of a process for updating a register in the processor of the data processing system of FIG. 1 with settings pertaining to energy efficiency.

FIG. 7 presents a flowchart of an example embodiment of a process for updating LPCS register 52 with settings pertaining to energy efficiency. The process of FIG. 7 may run concurrently with the processes of FIG. 2 and FIGS. 3A-3B. As shown at block 410, OS 60 may update low-priority-core list 66 when appropriate, as described above with regard to FIGS. 2 and 3A-3B. OS 60 may then determine whether a predetermined amount of time (i.e., an "update interval") has elapsed since OS 60 has updated LPCS register 52. If the update interval has elapsed, OS 60 may write the data from low-priority-core list 66 to LPCS register 52, as shown at block 422. In addition, OS 60 may save a timestamp for the update, to establish the beginning of the next update interval, as shown at block 424. As shown at block 426, processor 12 may then manage the efficiency and performance of cores 20 and 30, based on the new settings in LPCS register 52. However, referring again to block 420, if the update interval has not yet elapsed, OS 60 may continue to manage the efficiency and performance of cores 20 and 30, based on the existing settings in LPCS register 52.

Furthermore, PMU 50 may use LPCS register 52 to more effectively manage the performance and efficiency of processor 12. For instance, PMU 50 may use LPCS register 52 to determine which cores are not running any high-priority threads (i.e., which cores are low-priority cores), and PMU 50 may then apply more aggressive efficiency techniques to those cores. By contrast, if a processor were to rely solely on EPP settings, the processor might not apply such aggressive efficiency techniques. For instance, a conventional processor with a core with two LPs and with EPP settings of about 70% towards efficiency, might run that core at a higher P-state than is actually needed for the specified efficiency percentage, in order to avoid providing inadequate performance. For instance, an OS might specify EPP settings of about 70% towards efficiency for foreground work such as media playback, and the processor might run the core at a higher P-state than the P-state that corresponds to 70% efficiency in order to avoid an adverse impact on the user experience.

By contrast, processor 12 considers EPP registers 23, 25, 33, and 35, as well as LPCS register 52, and processor 12 switches to more aggressive power-saving algorithms when those settings agree, with regard to the desired or suitable level of efficiency. Processor may also switch to more aggressive performance algorithms when those settings agree, with regard to the desired or suitable level of performance.

For instance, when the EPP settings and the settings in LPCS register 52 are considered together, and those settings agree that one core has more high-priority threads than other cores, processor 12 may redirect hardware resources to the core with more high-priority threads from one or more cores with lower priority threads. Those hardware resources may include, for instance, cache, memory bandwidth, ring bandwidth, etc. For example, processor 12 may prioritize ring bandwidth requests from the core with more high-priority threads, and/or processor 12 may allocate more cache (e.g., 80% of the cache) to the core with more high-priority threads. Similarly, data processing system 10 may prioritize memory bandwidth requests from the core with more high-priority thread, etc.

In addition or alternatively, processor 12 may use aggressive efficiency techniques in response to determining that the settings in LPCS register 52 and the EPP settings agree in indicating that all cores in a package are low-priority cores (i.e., that no LPs are running high-priority threads). For instance, processor 12 may duty cycles all of the cores. In addition or alternatively, processor 12 may switch to lower P-states to implement a more restrictive energy budget, based on core "C-state" utilization (e.g., C0 percentage utilization), etc. In addition or alternatively, processor 12 may switch to aggressive package idle entries.

In addition, when a high-priority core has multiple high-priority LPs, OS 60 may automatically transfer a thread from one of those LPs to an idle LP on another core, in response to that idle LP entering idle. In particular, OS 60 may perform such a transfer when a core is running two low-priority threads, and then one of those threads terminates. Consequently, after OS 60 transfers one of the threads away from the high-priority core, that high-priority core may be able to execute more quickly and/or effectively, due to its reduced workload.

A data processing system may use the present teachings to realize desired levels of performance and efficiency. For instance, by grouping background work (e.g., work for which a high quality of service (QoS) is not needed) on background cores, and thereby making full physical cores available for foreground work (e.g., work for which a high quality of service (QoS) is desired), a processor may avoid or reduce thread migration and thread signaling across cores, and may thereby realize increased responsiveness. The processor may also run background cores more efficiently, thereby improving battery life, and also improving performance and responsiveness on cores running foreground work, due to additional energy budget available from running background cores efficiently.

ADDITIONAL EMBODIMENTS

FIGS. 8-12 are block diagrams of exemplary computer architectures. The same or similar elements in FIGS. 8-12 bear like reference numerals. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
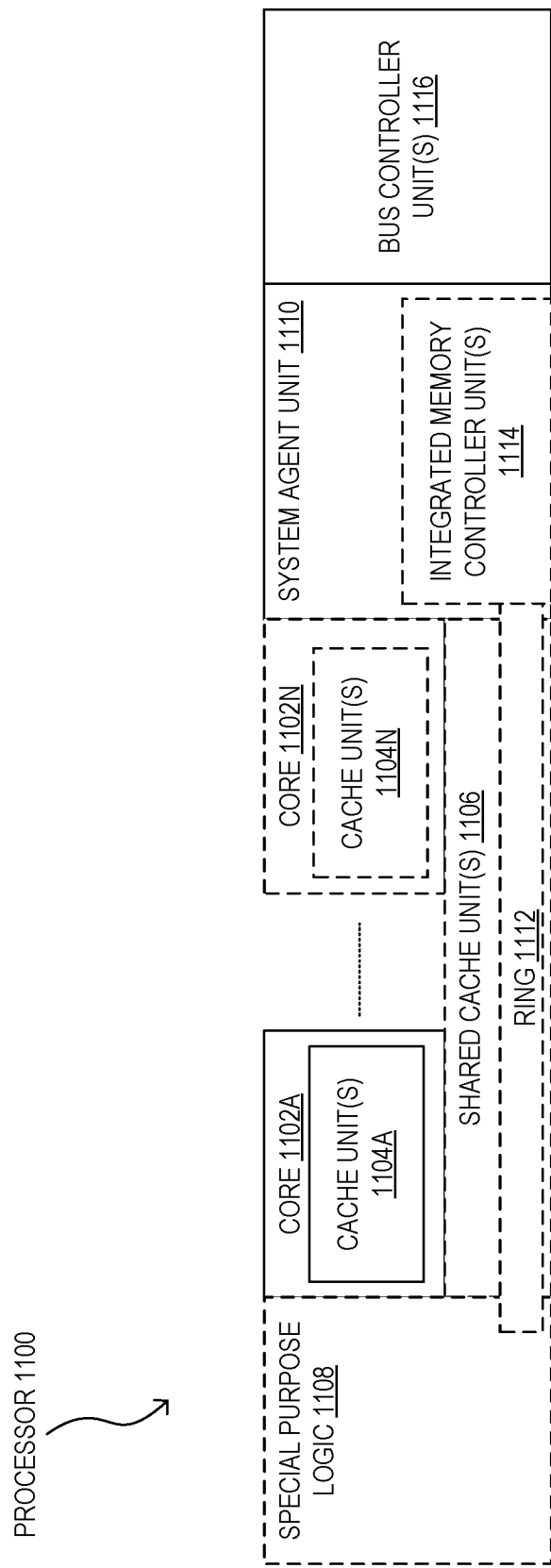
FIG. 8 is a block diagram of a processor that may have more than one core, may have an integrated memory controller, and may have integrated graphics according to embodiments of the invention.

FIG. 8 is a block diagram of a processor 1100 that may have more than one core, may have an integrated memory controller, and may have integrated graphics according to embodiments of the invention. The solid lined boxes in FIG. 8 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache units 1104A-N within the cores, a set or one or more shared cache units 1106, and external memory (not shown) coupled to the set of integrated memory controller units 1114. The set of shared cache units 1106 may include one or more mid-level caches, such as L2, level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102 A-N.

The system agent unit 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. Such cores 1102A-N may convert certain memory access instructions into subline memory access instructions as described herein.

Figure 9:
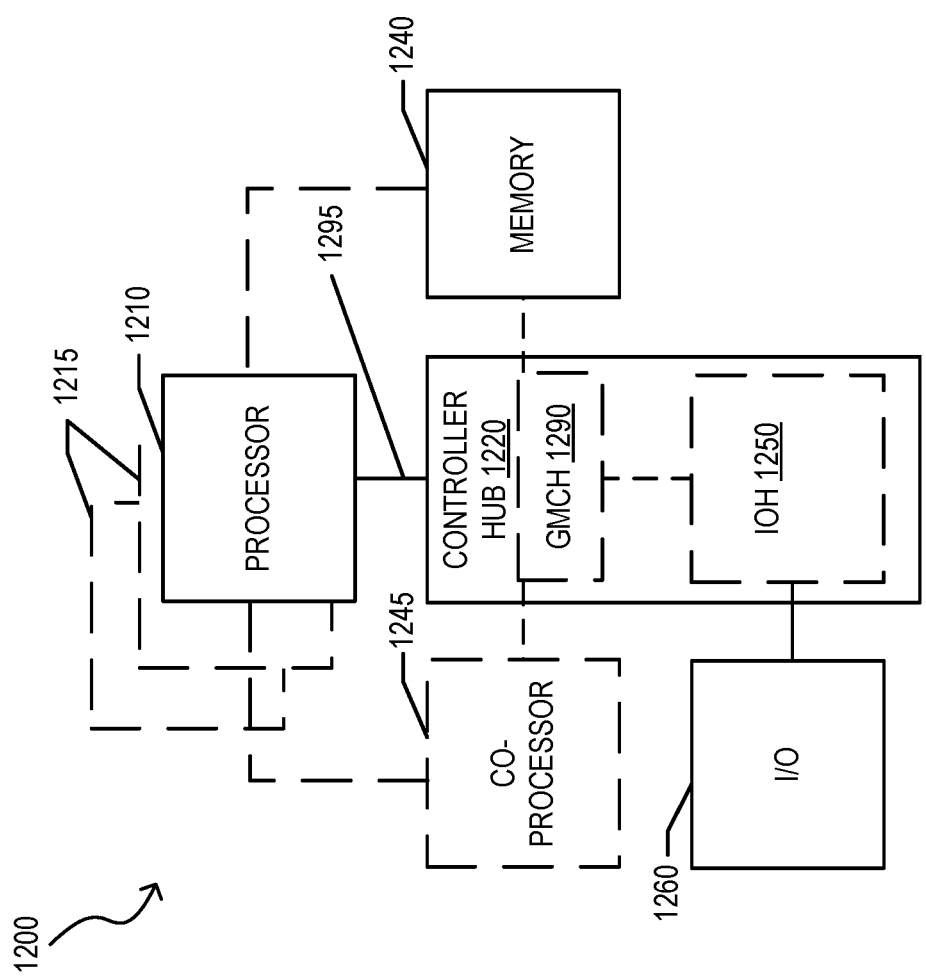
FIG. 9 is a block diagram of a system according to embodiments of the invention.

FIG. 9 is a block diagram of a system 1200 according to embodiments of the invention. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes a memory controller to control operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor, the memory 1240 and the coprocessor 1245 are coupled directly to the processor 1210, and the controller hub 1220 is in a single chip with the IOH 1250.

The optional nature of additional processors 1215 is denoted in FIG. 9 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 10:
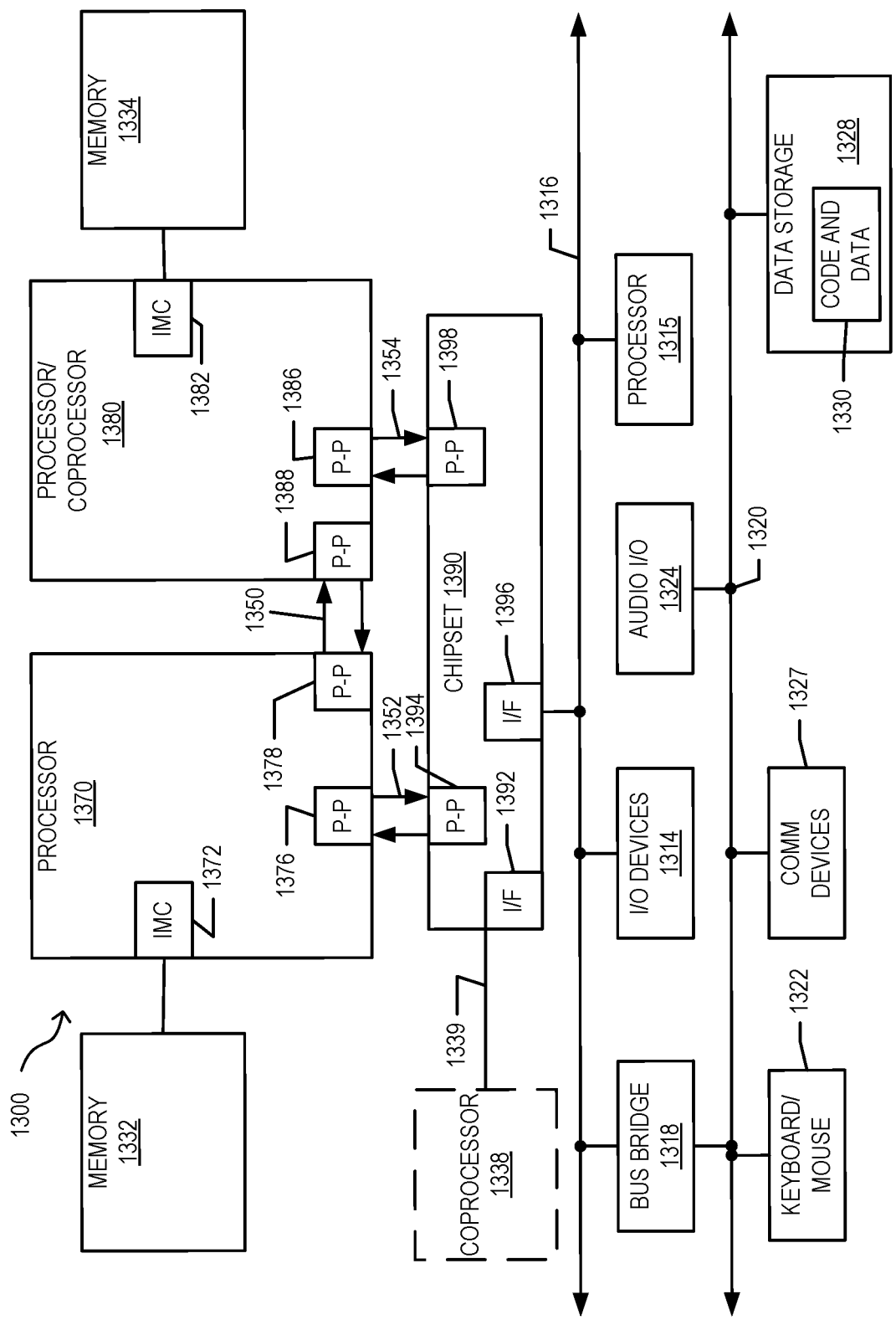
FIGS. 10 and 11 are block diagrams of more specific exemplary systems according to embodiments of the invention.
Figure 11:
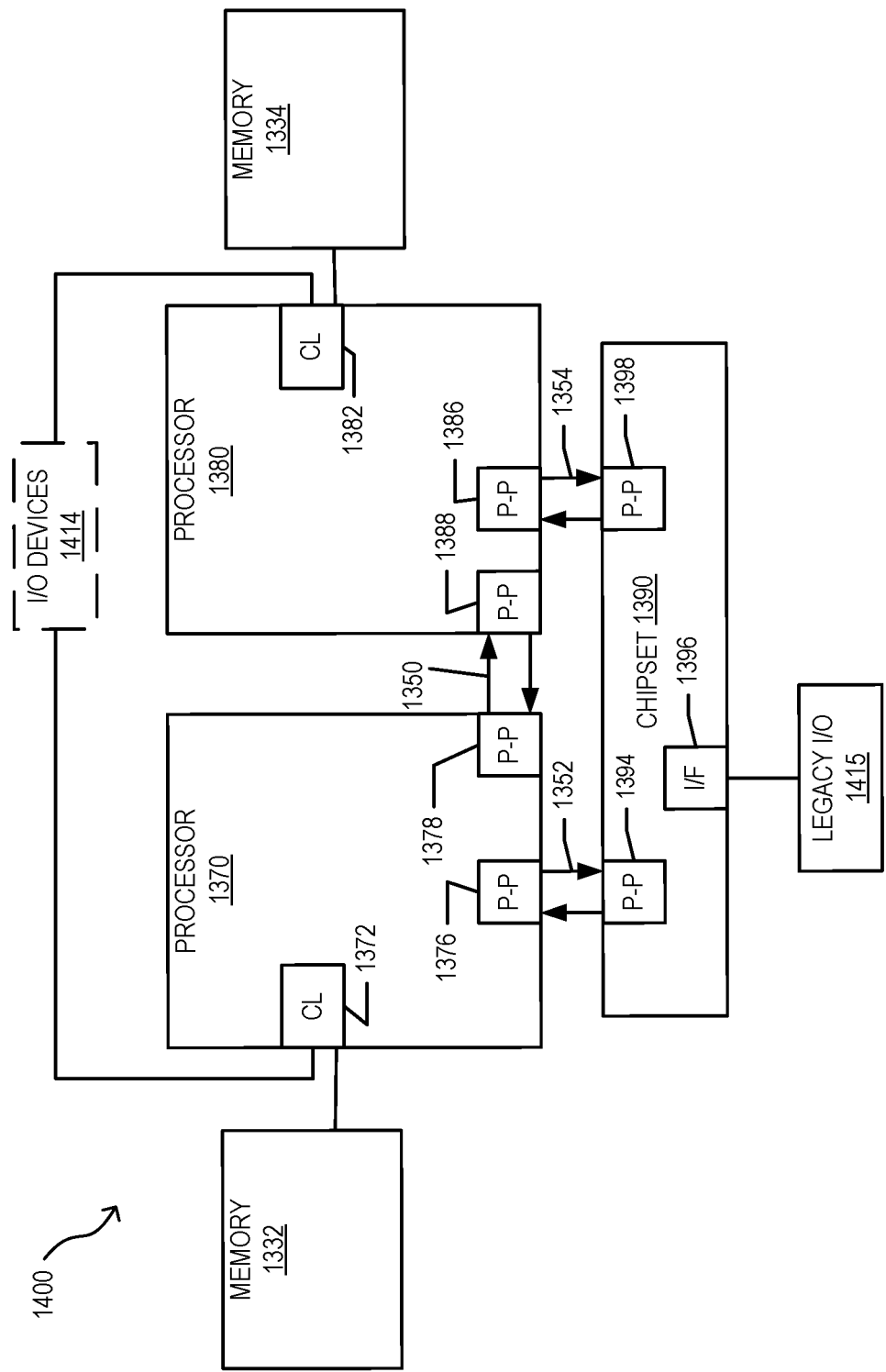

FIGS. 10 and 11 are block diagrams of more specific exemplary systems 1300 and 1400 according to embodiments of the invention. As shown in FIG. 10, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a P-P interface 1350 using P-P interface circuits 1378, 1388. As shown in FIG. 10, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 10, various I/O devices 1314 may be coupled to first bus 1316, along with a bus bridge 1318 which couples first bus 1316 to a second bus 1320. In one embodiment, one or more additional processors 1315, such as coprocessors, high-throughput MIC processors, GPGPUs, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 10, a system may implement a multi-drop bus or other such architecture.

FIG. 11 presents a block diagram of a second more specific exemplary system 1400 in accordance with an embodiment of the present invention. Certain aspects of FIG. 10 have been omitted from FIG. 11 in order to avoid obscuring other aspects of FIG. 11.

FIG. 11 illustrates that the processors 1370, 1380 may include integrated memory and I/O control logic ("CL") 1372 and 1382, respectively. Thus, the CL 1372, 1382 include integrated memory controller units and include I/O control logic. FIG. 11 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 12:
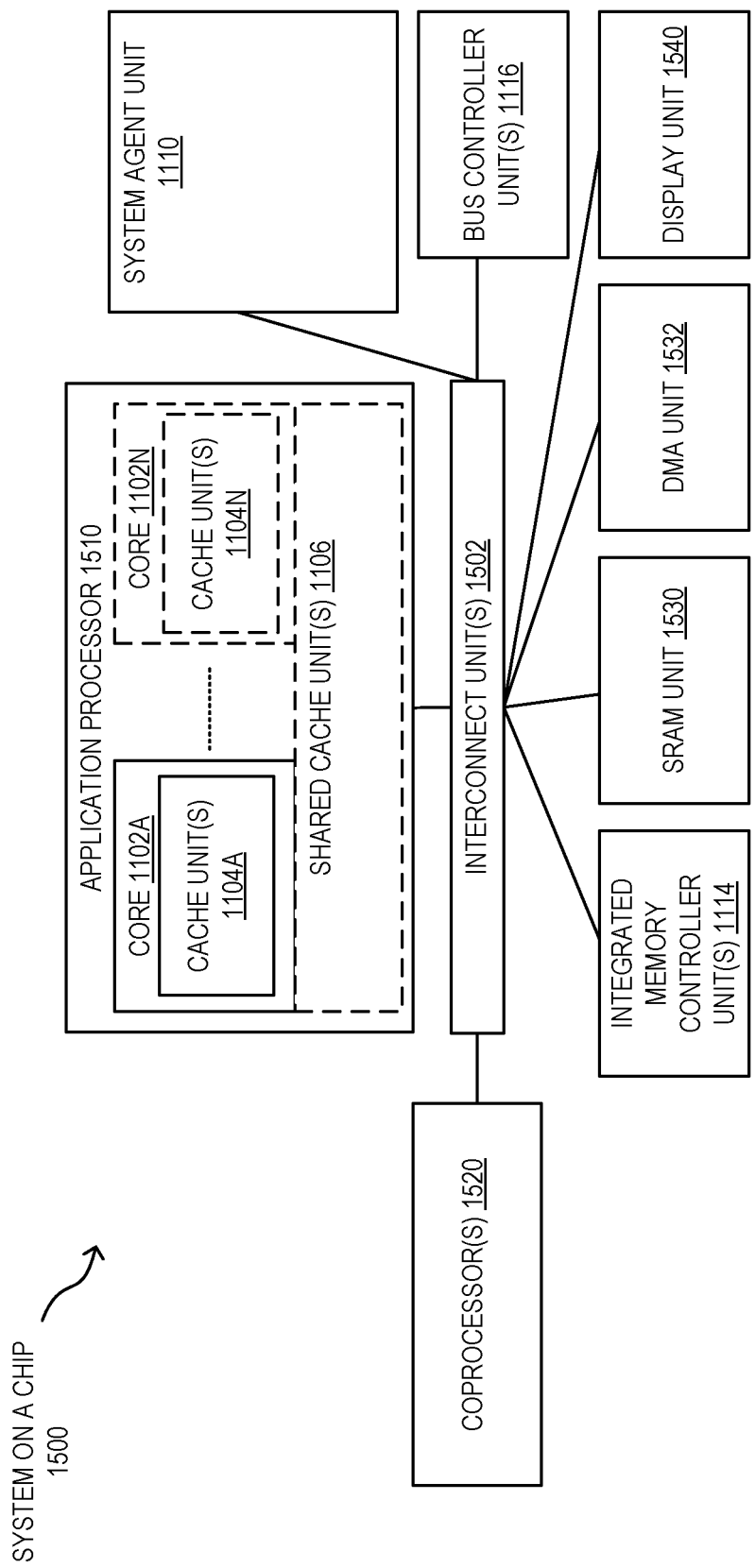
FIG. 12 is a block diagram of a system on a chip according to embodiments of the invention.

FIG. 12 is a block diagram of a system on a chip (SoC) 1500 according to embodiments of the invention. Dashed lined boxes are optional features on more advanced SoCs. In FIG. 12, an interconnect unit(s) 1502 is coupled to: an application processor 1510 which includes a set of one or more cores 1102A-N (including constituent cache units 1104A-N) and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

CONCLUSION

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, according to the present disclosure, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module.

Also, the operations which the software causes a device to perform may include creating an operating context, instantiating a particular data structure, etc. Embodiments may be implemented as software to execute on a programmable system comprising at least one processor, a storage system (e.g., volatile memory and/or one or more non-volatile storage elements), at least one input device, and at least one output device.

Any suitable operating environment and programming language (or combination of operating environments and programming languages) may be used to implement software components described herein. For example, program code may be implemented in a high-level procedural or object oriented programming language, or in assembly or machine language. The mechanisms described herein are not limited to any particular programming language. In any case, the language may be a compiled or interpreted language.

A medium which contains data and which allows another component to obtain that data may be referred to as a machine-accessible medium or a machine-readable medium. Accordingly, embodiments may include machine-readable media containing instructions for performing some or all of the operations described herein. Such media may be referred to in general as apparatus and in particular as program products. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Other embodiments may be implemented in data and may be stored on a non-transitory storage medium, which if used by at least one machine, causes the at least one machine to fabricate at least one integrated circuit to perform one or more operations according to the present disclosure. Still further embodiments may be implemented in a computer readable storage medium including information that, when manufactured into an SoC or other processor, is to configure the SoC or other processor to perform one or more operations according to the present disclosure. One or more aspects of at least one embodiment may be implemented by representative instructions, stored on a machine-readable medium, which represent various logic units within the processor, and which, when read by a machine, cause the machine to fabricate logic units to perform the techniques described herein. The instructions representing various logic units may be referred to as "IP cores," and they may be stored on a tangible, machine-readable medium and supplied to various customers or manufacturing facilities to load into the fabrication machines that actually make the logic units or the processor. One or more aspects of at least one embodiment may include machine-readable media containing instructions or design data which defines structures, circuits, apparatuses, processors and/or system features described herein. For instance, design data may be formatted in a hardware description language (HDL).

The machine-readable media for some embodiments may include, without limitation, tangible non-transitory storage components such as magnetic disks, optical disks, magneto-optical disks, dynamic random access memory (RAM), static RAM, read-only memory (ROM), solid state drives (SSDs), phase change memory (PCM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, components may be implemented as hardware, software, or combinations of hardware and software for providing the functionality described and illustrated herein. In some embodiments, some or all of the control logic for implementing the described operations may be implemented in hardware logic (e.g., as microcode in an integrated circuit chip, as a programmable gate array (PGA), as an application-specific integrated circuit (ASIC), etc.). Also, terms such as "circuit" and "circuitry" may be used interchangeably herein. Those terms and terms like "logic" may be used to refer to analog circuitry, digital circuitry, hard-wired circuitry, programmable circuitry, processor circuitry, microcontroller circuitry, hardware logic circuitry, state machine circuitry, any other type of hardware component, or any suitable combination of hardware components.

Additionally, the present teachings may be used to advantage in many different kinds of data processing systems. Such data processing systems may include, without limitation, accelerators, systems on a chip (SoCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

Embodiments include the following examples:

Example A1 is an apparatus with technology for dynamically grouping threads. The apparatus comprises a non-transitory machine-readable medium, and instructions in the machine-readable medium which, when executed by a data processing system with a processor comprising multiple cores and multiple LPs per core, enable the data processing system to perform operations comprising (a) selecting one of the LPs in the processor to receive a new low-priority thread; and (b) assigning the new low-priority thread to the selected LP. Also, the operation of selecting one of the LPs in the processor to receive the new low-priority thread comprises (1) when a first core in the processor has multiple idle LPs, automatically determining whether a second core in the processor has (a) an idle LP and (b) a busy LP that is executing a current low-priority thread; and (2) in response to determining that the second core has (a) an idle LP and (b) a busy LP that is executing a current low-priority thread, automatically selecting the idle LP in the second core to receive the new low-priority thread.

Example A2 is an apparatus according to Example A1, wherein the instructions, when executed, enable the data processing system to perform further operations comprising (a) after automatically selecting the idle LP in the second core to receive the new low-priority thread, automatically setting an EPP register for the idle LP in the second core with a value to indicate a preference for energy efficiency; and (b) after setting the EPP register for the idle LP in the second core with a value to indicate a preference for energy efficiency, running the second core at a low power state.

Example A3 is an apparatus according to Example A1, wherein the instructions, when executed, enable the data processing system to perform further operations comprising: after automatically assigning the new low-priority thread to the idle LP in the second core, (a) assigning a new high-priority thread to an idle LP in the first core, (b) setting an EPP register for the idle LP in the first core with a value to indicate a preference for performance, and (c) running the first core at a high power state. Example A3 may also include the features of Example A2.

Example A4 is an apparatus according to Example A1, wherein the operation of selecting one of the LPs in the processor to receive the new low-priority thread further comprises: (1) when none of the cores in the processor has all of its LPs idle, automatically determining whether any of the cores has (a) an idle LP and (b) a busy LP that is executing a current low-priority thread; (2) in response to determining that a select core has (a) an idle LP and (b) a busy LP that is executing a current low-priority thread, automatically (i) assigning the new low-priority thread to the idle LP in the select core and (ii) setting an EPP register for the idle LP in the select core with a value to indicate a preference for energy efficiency; and (3) after automatically assigning the new low-priority thread to the idle LP in the select core, running the select core at a low power state. Example A4 may also include the features of any one or more of Examples A2-A3.

Example A5 is an apparatus according to Example A4, wherein, when the select core comprises the first core, the instructions, when executed, enable the data processing system to perform further operations comprising: after automatically assigning the new low-priority thread to the idle LP in the first core, (a) assigning a new high-priority thread to an idle LP in the second core, (b) setting the EPP register for the idle LP in the second core with a value to indicate a preference for performance, and (c) running the second core at a high-power state.

Example A6 is an apparatus according to Example A1, wherein the operation of selecting one of the LPs in the processor to receive the new low-priority thread further comprises: (1) when none of the LPs is idle, automatically determining whether any of the cores has all of its LPs executing low-priority threads; and (2) in response to determining that a select core has all of its LPs executing low-priority threads, automatically assigning the new low-priority thread to one of the LPs in the select core. Example A6 may also include the features of any one or more of Examples A2-A5.

Example A7 is an apparatus according to Example A6, wherein the instructions, when executed, enable the data processing system to perform further operations comprising: after automatically assigning the new low-priority thread to one of the LPs in the select core, running the select core at a low power state.

Example A8 is an apparatus according to Example A1, wherein the instructions, when executed, enable the data processing system to perform further operations comprising: when multiple high-priority threads are executing on the first core, in response to the second core entering idle, (a) transferring one of the high-priority threads from the first core to the LP in the second core that entered idle and (b) setting an EPP register for that LP with a value to indicate a preference for performance.

Example B1 is a data processing system with technology for dynamically grouping threads. The data processing system comprises a first core comprising multiple LPs, a second core comprising multiple LPs, a machine-readable medium responsive to the first and second cores, and an OS stored at least in part in the machine-readable medium. The OS, when executed in the data processing system, enables the data processing system to perform operations comprising: selecting one of the LPs in the processor to receive a new low-priority thread, and assigning the new low-priority thread to the selected LP. The operation of selecting one of the LPs in the processor to receive the new low-priority thread comprises: (1) when the first core has multiple idle LPs, automatically determining whether the second core has (a) an idle LP and (b) a busy LP that is executing a current low-priority thread; and (2) in response to determining that the second core has (a) an idle LP and (b) a busy LP that is executing a current low-priority thread, automatically selecting the idle LP in the second core to receive the new low-priority thread.

Example B2 is a data processing system according to Example B1, further comprising an EPP register for each LP of each core. Also, the OS, when executed, enables the data processing system to perform further operations comprising: (1) after automatically selecting the idle LP in the second core to receive the new low-priority thread, automatically setting the EPP register for the idle LP in the second core with a value to indicate a preference for energy efficiency; and (2) after setting the EPP register for the idle LP in the second core with a value to indicate a preference for energy efficiency, running the second core at a low power state.

Example B3 is a data processing system according to Example B1, further comprising an EPP register for each LP of each core. Also, the OS, when executed, enables the data processing system to perform further operations comprising: after automatically assigning the new low-priority thread to the idle LP in the second core, (a) assigning a new high-priority thread to an idle LP in the first core, (b) setting the EPP register for the idle LP in the first core with a value to indicate a preference for performance, and (c) running the first core at a high power state. Example B3 may also include the features of Example B2.

Example B4 is a data processing system according to Example B1, further comprising an EPP register for each LP of each core. Also, the operation of selecting one of the LPs in the processor to receive the new low-priority thread further comprises: (1) when none of the cores has all of its LPs idle, automatically determining whether any of the cores has (a) an idle LP and (b) a busy LP that is executing a current low-priority thread; (2) in response to determining that a select core has (a) an idle LP and (b) a busy LP that is executing a current low-priority thread, automatically (i) assigning the new low-priority thread to the idle LP in the select core and (ii) setting the EPP register for the idle LP in the select core with a value to indicate a preference for energy efficiency; and (3) after automatically assigning the new low-priority thread to the idle LP in the select core, running the select core at a low power state. Example B4 may also include the features of any one or more of Examples B2-B3.

Example B5 is a data processing system according to Example B4, wherein, when the select core comprises the first core, the OS, when executed, enables the data processing system to perform further operations comprising: after automatically assigning the new low-priority thread to the idle LP in the first core, (a) assigning a new high-priority thread to an idle LP in the second core, (b) setting the EPP register for the idle LP in the second core with a value to indicate a preference for performance, and (c) running the second core at a high-power state.

Example B6 is a data processing system according to Example B1, wherein the operation of selecting one of the LPs in the processor to receive the new low-priority thread further comprises: (1) when none of the cores is idle, automatically determining whether any of the cores has all of its LPs executing low-priority threads; and (2) in response to determining that a select core has all of its LPs executing low-priority threads, automatically assigning the new low-priority thread to one of the LPs in the select core. Example B6 may also include the features of any one or more of Examples B2-B5.

Example B7 is a data processing system according to Example B6, wherein, when the select core comprises the first core, the OS, when executed, enables the data processing system to perform further operations comprising: after automatically assigning the new low-priority thread to one of the LPs in the select core, running the select core at a low power state.

Example B8 is a data processing system according to Example B1, further comprising an EPP register for each LP of each core. Also, the OS, when executed, enables the data processing system to perform further operations comprising: when multiple high-priority threads are executing on the first core, in response to the second core entering idle, (a) transferring one of the high-priority threads from the first core to the LP in the second core that entered idle and (b) setting the EPP register for that LP with a value to indicate a preference for performance. Example B8 may also include the features of any one or more of Examples B2-B7.

Example B9 is a data processing system according to Example B1, further comprising: (1) a CPU, (2) an EPP register for each LP of each core, and (3) a low-priority-core-set (LPCS) register. Also, the first and second cores, the EPP registers, and the LPCS register reside in the CPU. Also, the OS, when executed, writes data to the LPCS register to indicate which cores are not running any high-priority threads. Also, the CPU, when powered on, enables the data processing system to perform operations comprising: (1) automatically determining whether any of the cores is not running any high-priority threads, based on the data in the LPCS register; and (2) in response to determining that the first core is not running any high-priority threads, automatically redirecting hardware resources from the first core to the second core. Example B9 may also include the features of any one or more of Examples B2-B8.

Example B10 is a data processing system according to Example B9, wherein the hardware resources comprise at least one resource from the group consisting of cache, memory bandwidth, and ring bandwidth.

Example C1 is a method for dynamically grouping threads. The method comprises: in a data processing system with a processor comprising multiple cores and multiple LPs per core, (a) selecting one of the LPs in the processor to receive a new low-priority thread, and (b) assigning the new low-priority thread to the selected LP. Also, the operation of selecting one of the LPs in the processor to receive the new low-priority thread comprises: (1) when a first core in the processor has multiple idle LPs, automatically determining whether a second core in the processor has (a) an idle LP and (b) a busy LP that is executing a current low-priority thread; and (2) in response to determining that the second core has (a) an idle LP and (b) a busy LP that is executing a current low-priority thread, automatically selecting the idle LP in the second core to receive the new low-priority thread.

Example C2 is a method according to Example C1, further comprising: (1) after automatically selecting the idle LP in the second core to receive the new low-priority thread, automatically setting an efficiency/performance preference (EPP) register for the idle LP in the second core with a value to indicate a preference for energy efficiency; and (2) after setting the EPP register for the idle LP in the second core with a value to indicate a preference for energy efficiency, running the second core at a low power state.

Example C3 is a method according to Example C1, wherein the operation of selecting one of the LPs in the processor to receive the new low-priority thread further comprises: (1) when none of the cores in the processor has all of its LPs idle, automatically determining whether any of the cores has (a) an idle LP and (b) a busy LP that is executing a current low-priority thread; (2) in response to determining that a select core has (a) an idle LP and (b) a busy LP that is executing a current low-priority thread, automatically (i) assigning the new low-priority thread to the idle LP in the select core and (ii) setting an efficiency/performance preference (EPP) register for the idle LP in the select core with a value to indicate a preference for energy efficiency; and (3) after automatically assigning the new low-priority thread to the idle LP in the select core, running the select core at a low power state.

Example C4 is a method according to Example C1, wherein the operation of selecting one of the LPs in the processor to receive the new low-priority thread further comprises: (1) when none of the LPs is idle, automatically determining whether any of the cores has all of its LPs executing low-priority threads; and (2) in response to determining that a select core has all of its LPs executing low-priority threads, automatically assigning the new low-priority thread to one of the LPs in the select core.

In view of the wide variety of useful permutations that may be readily derived from the example embodiments described herein, this detailed description is intended to be illustrative only, and should not be construed as limiting the scope of coverage.

What is claimed is:

1. An apparatus with technology for dynamically grouping threads, the apparatus comprising:
   a non-transitory machine-readable medium; and
   instructions in the non-transitory machine-readable medium which, when executed by a data processing system with a processor comprising multiple cores and multiple logical processors (LPs) per core, enable the data processing system to perform operations comprising:
      selecting one of the LPs in the processor to receive a new low-priority thread; and
      assigning the new low-priority thread to the selected LP; and
   wherein the operation of selecting one of the LPs in the processor to receive the new low-priority thread comprises:
      when a first core in the processor has multiple idle LPs, automatically determining whether a second core in the processor has (a) an idle LP and (b) a busy LP that is executing a current low-priority thread; and
      in response to determining that the second core has (a) an idle LP and (b) a busy LP that is executing a current low-priority thread, automatically selecting the idle LP in the second core to receive the new low-priority thread.

2. The apparatus according to claim 1, wherein the instructions, when executed, enable the data processing system to perform further operations comprising:
   after automatically selecting the idle LP in the second core to receive the new low-priority thread, automatically setting an efficiency/performance preference (EPP) register for the idle LP in the second core with a value to indicate a preference for energy efficiency; and
   after setting the EPP register for the idle LP in the second core with a value to indicate a preference for energy efficiency, running the second core at a low power state.

3. The apparatus according to claim 1, wherein the instructions, when executed, enable the data processing system to perform further operations comprising:
   after automatically assigning the new low-priority thread to the idle LP in the second core, (a) assigning a new high-priority thread to an idle LP in the first core, (b) setting an efficiency/performance preference (EPP) register for the idle LP in the first core with a value to indicate a preference for performance, and (c) running the first core at a high power state.

4. The apparatus according to claim 1, wherein the operation of selecting one of the LPs in the processor to receive the new low-priority thread further comprises:
   when none of the cores in the processor has all of its LPs idle, automatically determining whether any of the cores has (a) an idle LP and (b) a busy LP that is executing a current low-priority thread;
   in response to determining that a select core has (a) an idle LP and (b) a busy LP that is executing a current low-priority thread, automatically (i) assigning the new low-priority thread to the idle LP in the select core and (ii) setting an efficiency/performance preference (EPP) register for the idle LP in the select core with a value to indicate a preference for energy efficiency; and
   after automatically assigning the new low-priority thread to the idle LP in the select core, running the select core at a low power state.

5. The apparatus according to claim 4, wherein, when the select core comprises the first core, the instructions, when executed, enable the data processing system to perform further operations comprising:
   after automatically assigning the new low-priority thread to the idle LP in the first core, (a) assigning a new high-priority thread to an idle LP in the second core, (b) setting the EPP register for the idle LP in the second core with a value to indicate a preference for performance, and (c) running the second core at a high-power state.

6. The apparatus according to claim 1, wherein the operation of selecting one of the LPs in the processor to receive the new low-priority thread further comprises:
   when none of the LPs is idle, automatically determining whether any of the cores has all of its LPs executing low-priority threads; and
   in response to determining that a select core has all of its LPs executing low-priority threads, automatically assigning the new low-priority thread to one of the LPs in the select core.

7. The apparatus according to claim 6, wherein the instructions, when executed, enable the data processing system to perform further operations comprising:
   after automatically assigning the new low-priority thread to one of the LPs in the select core, running the select core at a low power state.

8. The apparatus according to claim 1, wherein the instructions, when executed, enable the data processing system to perform further operations comprising:
   when multiple high-priority threads are executing on the first core, in response to the second core entering idle, (a) transferring one of the high-priority threads from the first core to the LP in the second core that entered idle and (b) setting an efficiency/performance preference (EPP) register for that LP with a value to indicate a preference for performance.

9. A data processing system with technology for dynamically grouping threads, the data processing system comprising:

a first core comprising multiple logical processors (LPs);
a second core comprising multiple LPs;
a machine-readable medium responsive to the first and second cores; and
an operating system (OS) stored at least in part in the machine-readable medium, wherein the OS, when executed in the data processing system, enables the data processing system to perform operations comprising:
  selecting one of the LPs in the processor to receive a new low-priority thread; and
  assigning the new low-priority thread to the selected LP; and
wherein the operation of selecting one of the LPs in the processor to receive the new low-priority thread comprises:
  when the first core has multiple idle LPs, automatically determining whether the second core has (a) an idle LP and (b) a busy LP that is executing a current low-priority thread; and
  in response to determining that the second core has (a) an idle LP and (b) a busy LP that is executing a current low-priority thread, automatically selecting the idle LP in the second core to receive the new low-priority thread.

10. The data processing system according to claim 9, further comprising:
an efficiency/performance preference (EPP) register for each LP of each core; and
wherein the OS, when executed, enables the data processing system to perform further operations comprising:
  after automatically selecting the idle LP in the second core to receive the new low-priority thread, automatically setting the EPP register for the idle LP in the second core with a value to indicate a preference for energy efficiency; and
  after setting the EPP register for the idle LP in the second core with a value to indicate a preference for energy efficiency, running the second core at a low power state.

11. The data processing system according to claim 9, further comprising:
an efficiency/performance preference (EPP) register for each LP of each core; and
wherein the OS, when executed, enables the data processing system to perform further operations comprising:
after automatically assigning the new low-priority thread to the idle LP in the second core, (a) assigning a new high-priority thread to an idle LP in the first core, (b) setting the EPP register for the idle LP in the first core with a value to indicate a preference for performance, and (c) running the first core at a high power state.

12. The data processing system according to claim 9, further comprising:
an efficiency/performance preference (EPP) register for each LP of each core; and
wherein the operation of selecting one of the LPs in the processor to receive the new low-priority thread further comprises:
  when none of the cores has all of its LPs idle, automatically determining whether any of the cores has (a) an idle LP and (b) a busy LP that is executing a current low-priority thread;
  in response to determining that a select core has (a) an idle LP and (b) a busy LP that is executing a current low-priority thread, automatically (i) assigning the new low-priority thread to the idle LP in the select core and (ii) setting the EPP register for the idle LP in the select core with a value to indicate a preference for energy efficiency; and
  after automatically assigning the new low-priority thread to the idle LP in the select core, running the select core at a low power state.

13. The data processing system according to claim 12, wherein, when the select core comprises the first core, the OS, when executed, enables the data processing system to perform further operations comprising:
after automatically assigning the new low-priority thread to the idle LP in the first core, (a) assigning a new high-priority thread to an idle LP in the second core, (b) setting the EPP register for the idle LP in the second core with a value to indicate a preference for performance, and (c) running the second core at a high-power state.

14. The data processing system according to claim 9, wherein the operation of selecting one of the LPs in the processor to receive the new low-priority thread further comprises:
when none of the LPs is idle, automatically determining whether any of the cores has all of its LPs executing low-priority threads; and
in response to determining that a select core has all of its LPs executing low-priority threads, automatically assigning the new low-priority thread to one of the LPs in the select core.

15. The data processing system according to claim 14, wherein, when the select core comprises the first core, the OS, when executed, enables the data processing system to perform further operations comprising:
after automatically assigning the new low-priority thread to one of the LPs in the select core, running the select core at a low power state.

16. The data processing system according to claim 9, further comprising:
an efficiency/performance preference (EPP) register for each LP of each core; and
wherein the OS, when executed, enables the data processing system to perform further operations comprising:
  when multiple high-priority threads are executing on the first core, in response to the second core entering idle, (a) transferring one of the high-priority threads from the first core to the LP in the second core that entered idle and (b) setting the EPP register for that LP with a value to indicate a preference for performance.

17. The data processing system according to claim 9, further comprising:
a central processing unit (CPU);
an efficiency/performance preference (EPP) register for each LP of each core; and
a low-priority-core-set (LPCS) register;
wherein the first and second cores, the EPP registers, and the LPCS register reside in the CPU;
wherein the OS, when executed, writes data to the LPCS register to indicate which cores are not running any high-priority threads; and
wherein the CPU, when powered on, enables the data processing system to perform operations comprising:
  automatically determining whether any of the cores is not running any high-priority threads, based on the data in the LPCS register; and in response to determining that the first core is not running any high-priority threads, automatically redirecting hardware resources from the first core to the second core.

18. The data processing system according to claim 17, wherein the hardware resources comprise at least one resource from the group consisting of cache, memory bandwidth, and ring bandwidth.

19. A method for dynamically grouping threads, the method comprising:

in a data processing system with a processor comprising multiple cores and multiple logical processors (LPs) per core, (a) selecting one of the LPs in the processor to receive a new low-priority thread, and (b) assigning the new low-priority thread to the selected LP; and wherein the operation of selecting one of the LPs in the processor to receive the new low-priority thread comprises:

when a first core in the processor has multiple idle LPs, automatically determining whether a second core in the processor has (a) an idle LP and (b) a busy LP that is executing a current low-priority thread; and in response to determining that the second core has (a) an idle LP and (b) a busy LP that is executing a current low-priority thread, automatically selecting the idle LP in the second core to receive the new low-priority thread.

20. The method according to claim 19, further comprising:

after automatically selecting the idle LP in the second core to receive the new low-priority thread, automatically setting an efficiency/performance preference (EPP) register for the idle LP in the second core with a value to indicate a preference for energy efficiency; and after setting the EPP register for the idle LP in the second core with a value to indicate a preference for energy efficiency, running the second core at a low power state.

21. The method according to claim 19, wherein the operation of selecting one of the LPs in the processor to receive the new low-priority thread further comprises:

when none of the cores in the processor has all of its LPs idle, automatically determining whether any of the cores has (a) an idle LP and (b) a busy LP that is executing a current low-priority thread;

in response to determining that a select core has (a) an idle LP and (b) a busy LP that is executing a current low-priority thread, automatically (i) assigning the new low-priority thread to the idle LP in the select core and (ii) setting an efficiency/performance preference (EPP) register for the idle LP in the select core with a value to indicate a preference for energy efficiency; and after automatically assigning the new low-priority thread to the idle LP in the select core, running the select core at a low power state.

22. The method according to claim 19, wherein the operation of selecting one of the LPs in the processor to receive the new low-priority thread further comprises:

when none of the LPs is idle, automatically determining whether any of the cores has all of its LPs executing low-priority threads; and in response to determining that a select core has all of its LPs executing low-priority threads, automatically assigning the new low-priority thread to one of the LPs in the select core.

\* \* \* \* \*